(12) United States Patent
Takeda et al.

(10) Patent No.: US 12,289,700 B2
(45) Date of Patent: Apr. 29, 2025

(54) TERMINAL, BASE STATION, AND COMMUNICATION METHOD

(71) Applicant: NTT DOCOMO, INC., Tokyo (JP)

(72) Inventors: Daiki Takeda, Tokyo (JP); Kazuaki Takeda, Tokyo (JP); Takayuki Isogawa, Tokyo (JP); Takuma Takada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 477 days.

(21) Appl. No.: 17/433,089

(22) PCT Filed: Feb. 17, 2020

(86) PCT No.: PCT/JP2020/006112
§ 371 (c)(1),
(2) Date: Aug. 23, 2021

(87) PCT Pub. No.: WO2020/175219
PCT Pub. Date: Sep. 3, 2020

(65) Prior Publication Data
US 2022/0046573 A1 Feb. 10, 2022

(30) Foreign Application Priority Data
Feb. 27, 2019 (JP) .................. 2019-034674

(51) Int. Cl.
*H04W 56/00* (2009.01)
*H04W 72/23* (2023.01)
*H04W 88/02* (2009.01)

(52) U.S. Cl.
CPC ....... *H04W 56/0045* (2013.01); *H04W 72/23* (2023.01); *H04W 88/02* (2013.01)

(58) Field of Classification Search
CPC .. H04W 56/0045; H04W 72/23; H04W 88/02
USPC ......................................... 370/336
See application file for complete search history.

(56) References Cited

U.S. PATENT DOCUMENTS

| | | | |
|---|---|---|---|
| 2020/0245334 A1* | 7/2020 | Phuyal | H04L 5/0055 |
| 2021/0360738 A1* | 11/2021 | Shan | H04W 68/005 |
| 2022/0022229 A1* | 1/2022 | Wong | H04W 72/20 |
| 2022/0022265 A1* | 1/2022 | Selvaganapathy | H04L 1/1896 |
| 2022/0038997 A1* | 2/2022 | Höglund | H04W 48/06 |
| 2022/0104225 A1* | 3/2022 | Yan | H04W 72/1268 |

OTHER PUBLICATIONS

U.S. Appl. No. 62/737,697, filed Sep. 37, 2018.*
3GPP R1-1810195; Chengdu, People's Republic of China, Oct. 8-12, 2018.*

(Continued)

*Primary Examiner* — Faisal Choudhury
(74) *Attorney, Agent, or Firm* — Osha Bergman Watanabe & Burton LLP

(57) ABSTRACT

A terminal includes a receiving unit that receives information indicating whether each condition of one or more conditions for validating a time alignment is activated or deactivated; and a control unit that independently activates or deactivates each condition of the one or more conditions in accordance with the received information.

4 Claims, 15 Drawing Sheets

(56) References Cited

OTHER PUBLICATIONS

3GPP TS 38.213 V15.3.0 "3rd Generation Partnership Project; Technical Specification Group Radio Access Network; NR; Physical layer procedures for control (Release 15)" Sep. 2018 (101 pages).

3GPP TS 38.304 V15.2.0 "3rd Generation Partnership Project; Technical Specification Group Radio Access Network; NR; User Equipment (UE) procedures in Idle mode and RRC Inactive state (Release 15)" Dec. 2018 (28 pages).

3GPP TS 38.331 V15.3.0 "3rd Generation Partnership Project; Technical Specification Group Radio Access Network; NR; Radio Resource Control (RRC) protocol specification (Release 15)" Sep. 2018 (445 pages).

3GPP TSG RAN WG1 Meeting #96; R1-1901511 "UL transmission in preconfigured resource" Huawei, HiSilicon; Athens, Greece; Feb. 25-Mar. 1, 2019 (8 pages).

3GPP TSG-RAN WG2 #105; Tdoc R2-1900737 "PUR TA validation & Release" Ericsson; Athens, Greece; Feb. 25-Mar. 1, 2019 (4 pages).

International Search Report issued in International Application No. PCT/JP2020/006112, mailed Apr. 28, 2020 (11 pages).

Written Opinion issued in International Application No. PCT/JP2020/006112; Dated Apr. 28, 2020 (6 pages).

Office Action issued in counterpart Japanese Patent Application No. 2021-501989 mailed on Feb. 13, 2024 (8 pages).

Lenovo et al.; "UL transmission in preconfigured resources for NBIoT"; 3GPP TSG RAN WG1 Meeting #96, R1-1902149; Athens, Greece; Feb. 25-Mar. 1, 2019 (6 pages).

Sierra Wireless; "LTE-M Preconfigured UL Resources Summary RAN1 #96"; 3GPP TSG RAN WG1 #96, R1-1903248; Athens, Greece; Feb. 25-Mar. 1, 2019 (11 pages).

Office Action issued in Australian Patent Application No. 2020227446, dated Oct. 14, 2024 (5 pages).

* cited by examiner

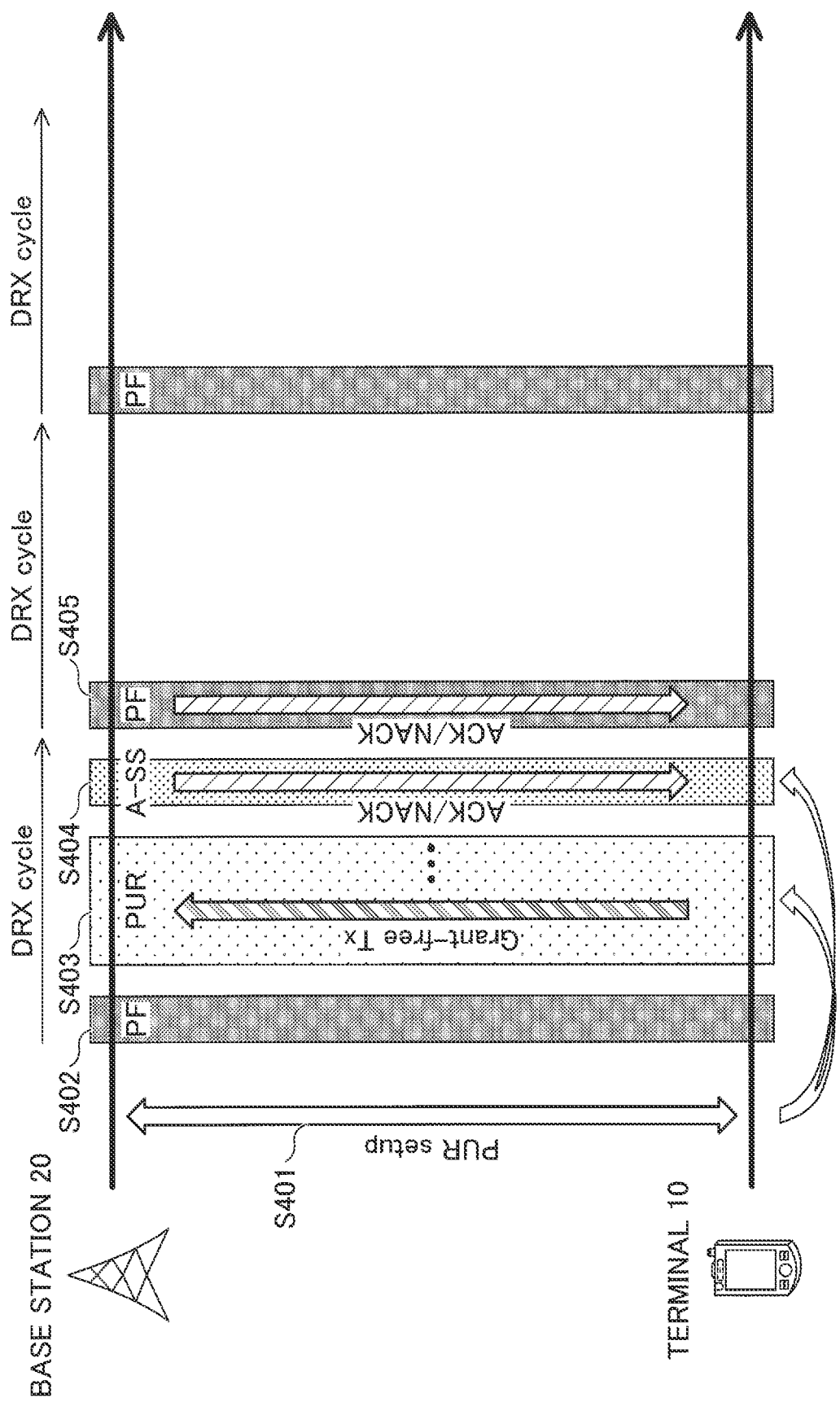

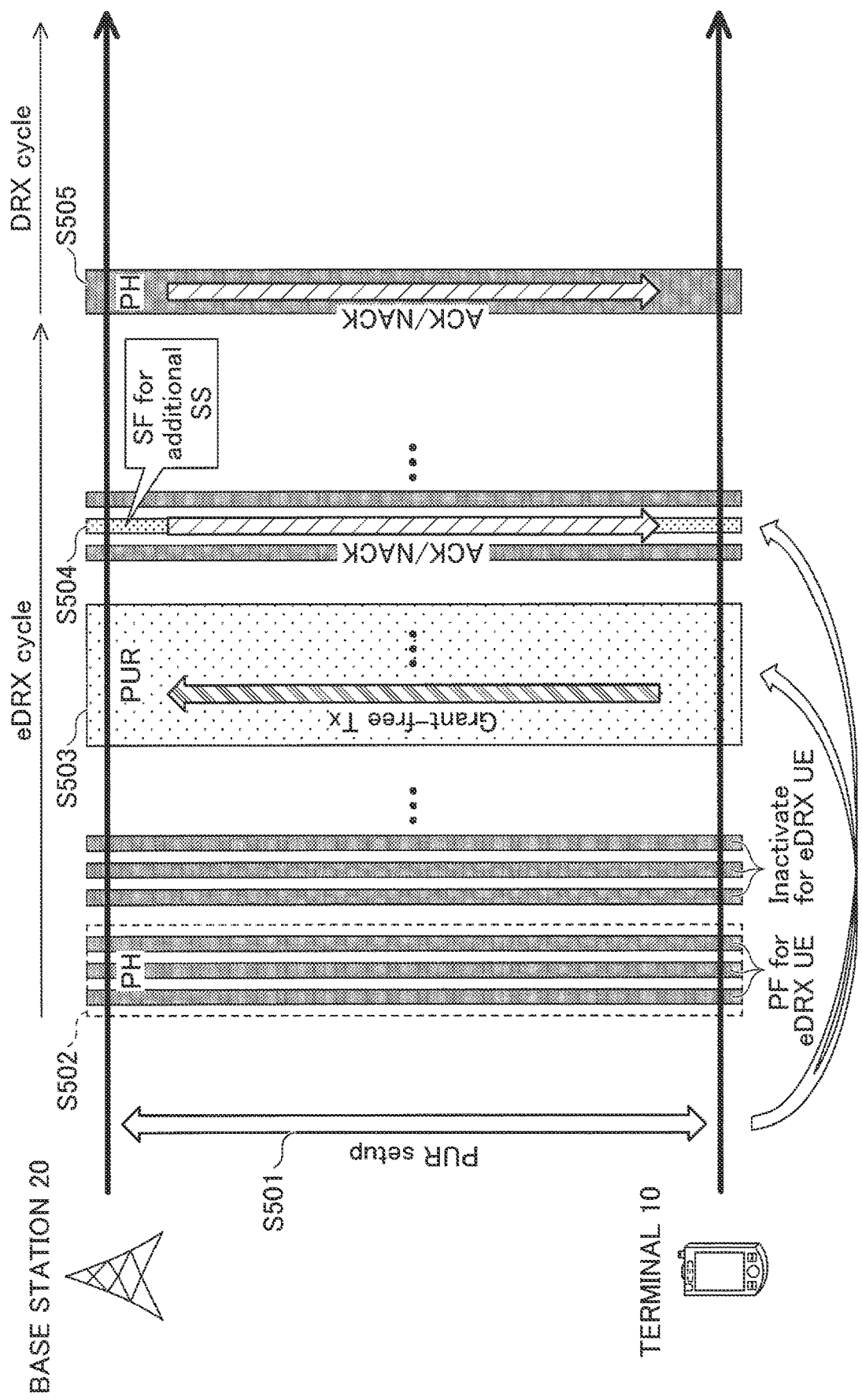

TERMINAL, BASE STATION, AND COMMUNICATION METHOD

TECHNICAL FIELD

The present invention relates to a terminal, a base station, and a communication method in a radio communication system.

BACKGROUND ART

Currently, in release 16 enhancement of 3rd Generation Partnership Project (3GPP) for LTE Internet of Things (IoT), i.e., Narrow Band IoT (NB-IoT) or enhanced Machine Type Communication (eMTC), preconfigured uplink (UL) resources (PUR) have been discussed. In addition, power saving for idle mode terminals may be discussed in New Radio (NR) from 3GPP release 17 onwards. In this case, a (Grant less, or Grant Free) transmission method may be specified in NR for idle mode terminals in which radio resource assignment from a network to the terminals is not assumed.

Radio communication using PUR mainly covers eMTC/NB-IoT enhancement of 3GPP release 16. However, radio communication using PUR is not limited to eMTC/NB-IoT enhancement of 3GPP release 16 and is assumed to be applied to the NR system.

RELATED ART DOCUMENT

Non-Patent Document

Non-Patent Document 1: 3GPP TS 38.304 V15.2.0 (2018 December)
Non-Patent Document 2: 3GPP TS 38.213 V15.3.0 (2018 September)
Non-Patent Document 3: 3GPP TS 38.331 V15.3.0 (2018 September)

SUMMARY OF THE INVENTION

Problem to be Solved by the Invention

An idle mode terminal can use PUR to transmit uplink data only if it has an appropriate Timing Advance (valid TA). Multiple conditions (TA validation attributes) have been considered, as conditions to be considered by an idle mode terminal to determine whether to perform TA validation. When transmitting all of the plurality of conditions from a base station to a terminal, or when transmitting from the terminal to the base station, an amount of information may increase. There is a need for a technique that allows an idle mode terminal to reduce overhead when signaling multiple conditions to be considered for determining whether to validate TA.

Means for Solving the Problem

According to an aspect of the present invention, there is provided a terminal including a receiving unit that receives information indicating whether each condition of one or more conditions for validating a time alignment is activated or deactivated; and a control unit that independently activates or deactivates each condition of the one or more conditions in accordance with the received information.

Advantage of the Invention

According to the disclosed technique, technology is provided that can reduce overhead when signaling multiple conditions to be considered by a terminal for determining whether to validate TA.

BRIEF DESCRIPTION OF DRAWINGS

FIG. 7 is a diagram illustrating an example of an operation in which a terminal receives transmission acknowledgement information when DRX is used.
FIG. 8 is a diagram illustrating an example of an operation in which a terminal receives transmission acknowledgement information when eDRX is used.

EMBODIMENTS OF THE INVENTION

In the following, embodiments of the present invention are described with reference to the drawings. The embodiments described below are only one example, and embodiments to which the present invention is applied are not limited to the following embodiments.

A radio communication system according to the following embodiments is assumed to basically conform to NR. However, this is an example, and the radio communication system according to the embodiments may conform to a radio communication system other than NR (e.g., LTE) in whole or in part.

(Overall System Configuration)

Figure 1:
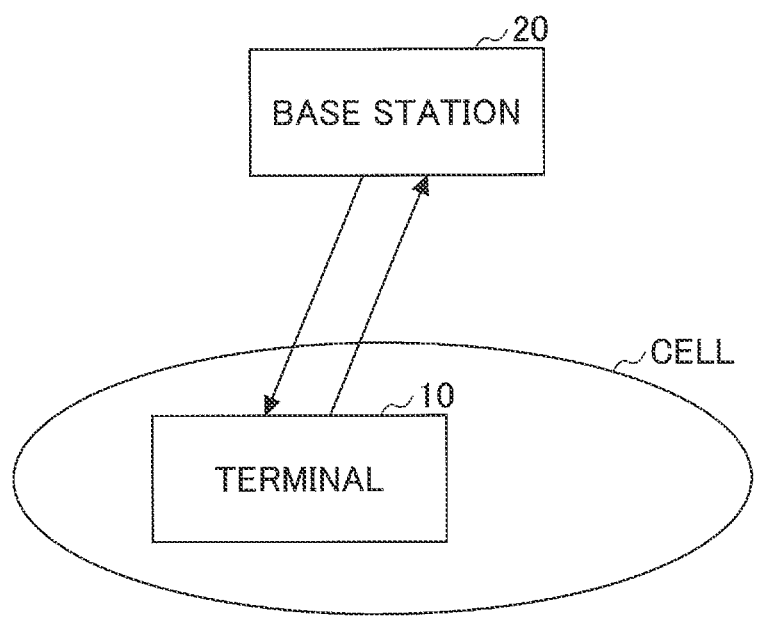
FIG. 1 is a diagram illustrating a configuration of a communication system according to an embodiment.

FIG. 1 illustrates a configuration diagram of a radio communication system according to an embodiment. The radio communication system according to the embodiment includes a terminal 10 and a base station 20, as illustrated in FIG. 1. In FIG. 1, one terminal 10 and one base station 20 are illustrated. However, this is an example, and there may be a plurality of terminals 10 and a plurality of base stations 20.

The terminal 10 is a communication device having a radio communication function, such as a smartphone, a cellular phone, a tablet, a wearable terminal, and a communication module for M2M (Machine-to-Machine). The terminal 10 wirelessly connects to the base station 20 and utilizes various communication services provided by the radio communication system. The base station 20 is a communication device that provides one or more cells and wirelessly communicates with the terminal 10.

In this embodiment, a duplex method may be a Time Division Duplex (TDD) method or a Frequency Division Duplex (FDD) method.

(Preconfigured Uplink Resources (PUR))

An example of a preconfigured uplink resource (PUR) is described with reference to FIG. 2. Although radio communication using the PUR described in FIG. 2 below is mainly directed to eMTC/NB-IoT enhancement of 3GPP release 16, the radio communication using the PUR is not limited to eMTC/NB-IoT enhancement of 3GPP release 16 and may be applied to an NR system.

Figure 2:
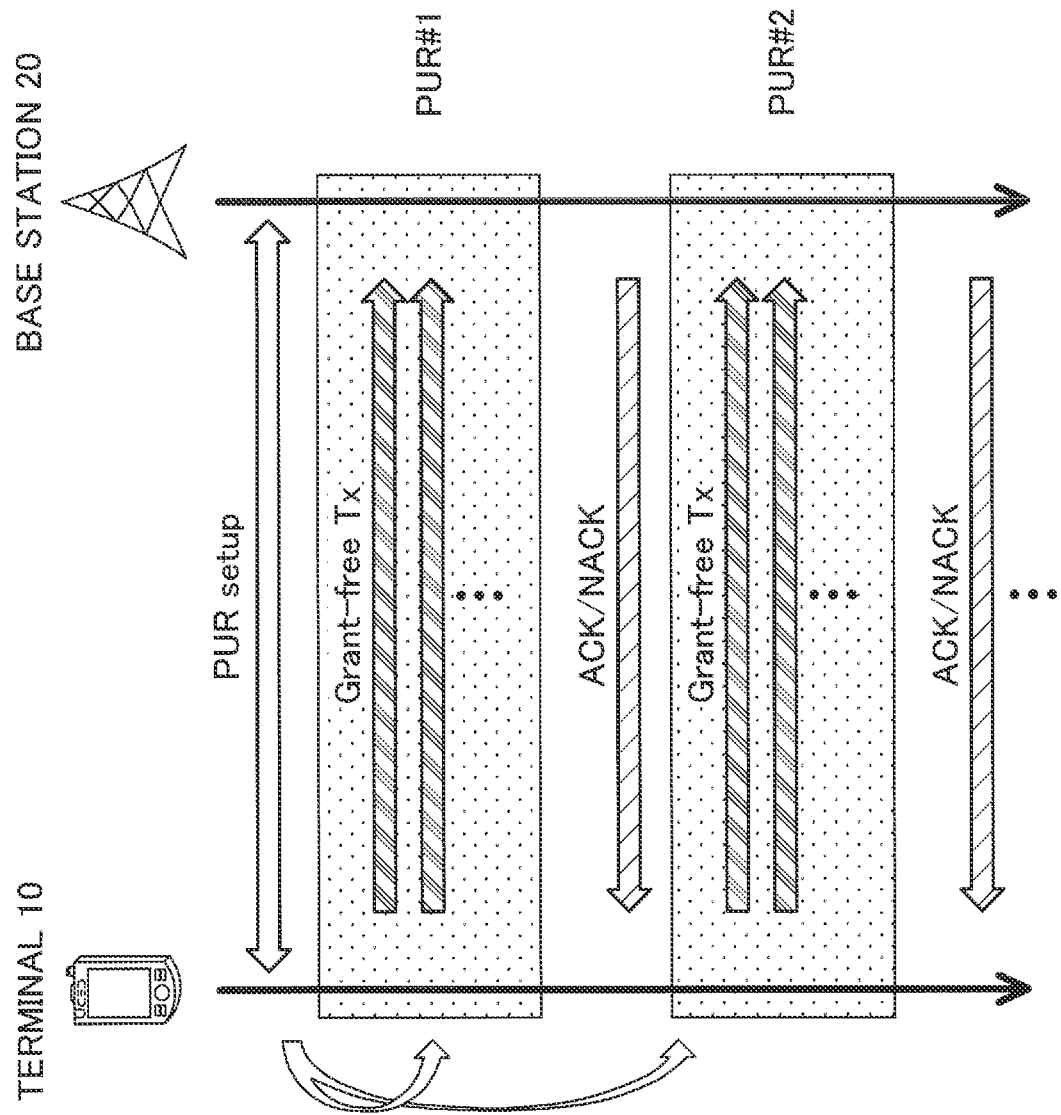
FIG. 2 is a diagram illustrating an example of radio communication using PUR.

As illustrated in FIG. 2, prior to performing communication, a PUR for the terminal to transmit data is configured between the base station 20 and the terminal 10. Subsequently, the terminal 10 periodically transmits data using the PUR. That is, after configuring the PUR between the base station 20 and the terminal 10, the terminal 10 transmits data using the PUR without being separately allocated radio resources from the base station 20.

The data transmission method of the terminal 10 using the above-described PUR assumes that the terminal 10 in the idle mode (idle mode) transmits the data. In this regard, the method of data transmission using the above-described PUR is different from a method of data transmission of the terminal 10 using semi-persistent scheduling.

The data transmission method by the terminal 10 using the PUR supports the terminal 10 in idle mode.

Since uplink transmission is performed, the terminal 10 is required to maintain a valid transmission timing of the terminal 10, i.e., a valid timing advance (TA: Timing Advance). In particular, as described above, in a method of data transmission using a PUR, only the terminal 10 maintaining a valid TA is allowed to use the PUR to transmit data since the terminal 10 in idle mode is supported.

In this regard, a problem is how the terminal 10 obtains a valid TA while in an idle mode.

A method can be considered such that, under an assumption that only the terminal 10 maintaining a valid TA can transmit data using a PUR, if the terminal 10 does not maintain a valid TA, the terminal 10 falls back to a Random Access Channel (RACH) procedure or an Early Data Transmission (EDT) procedure to obtain a valid TA again.

(Types of PUR)

The following three types of PUR are currently agreed by the 3GPP working group.

(1) Dedicated PUR
(2) Contention-based shared preconfigured UL resource (CBS PUR)
(3) Contention-free shared preconfigured UL resource (CFS PUR)

The Dedicated PUR described in (1) above is a PUR that is dedicatedly configured for a specific terminal 10. When the terminal 10 transmits using a Dedicated PUR, it is not necessary to apply a conflict resolution procedure because the transmit resource is a dedicated resource. When configuring this Dedicated PUR, the method of resource assignment in semi-permanent scheduling of LTE may be applied. Specifically, the Dedicated PUR is a dedicated Physical Uplink Shared Channel (PUSCH) resource used by only one terminal 10. The PUSCH resource is a time and frequency domain resource.

As for a method of sharing a PUR among the terminals 10 for (2) and (3), the details of the mechanism have not been provided yet.

The contention-based shared preconfigured UL resource (CBS PUR) in (2) above is a PUR shared among multiple terminals 10. When multiple terminals 10 transmit on a CBS PUR, the transmissions may collide among multiple terminals 10. Accordingly, when the plurality of terminals 10 transmit on the CBS PUR, it is considered that contention resolution is required. Specifically, the CBS PUR is a Physical Uplink Shared Channel (PUSCH) resource used by the plurality of terminals 10. The PUSCH resource is at least a time and frequency domain resource.

The contention-free shared preconfigured UL resource (CFS PUR) described in (3) above is a PUR in which a portion of the PUR is shared among multiple terminals 10, and the other portions of the PUR are not shared among multiple terminals 10 and dedicatedly assigned to the respective terminals 10. For example, as an example of a CFS PUR, for a Multi-user, Multiple Input, Multiple Output (MU-MIMO), Demodulation Reference Signals (DM-RSs) may be separately assigned to a respective plurality of terminals 10, and channel estimation may be separately performed for the respective plurality of terminals 10. The data itself may be transmitted by the plurality of terminals 10 using the same frequency resource. Specifically, the CFS PUR is a Physical Uplink Shared Channel (PUSCH) resource used by the plurality of terminals 10. The PUSCH resource is at least a time and frequency domain resource.

Figure 3:
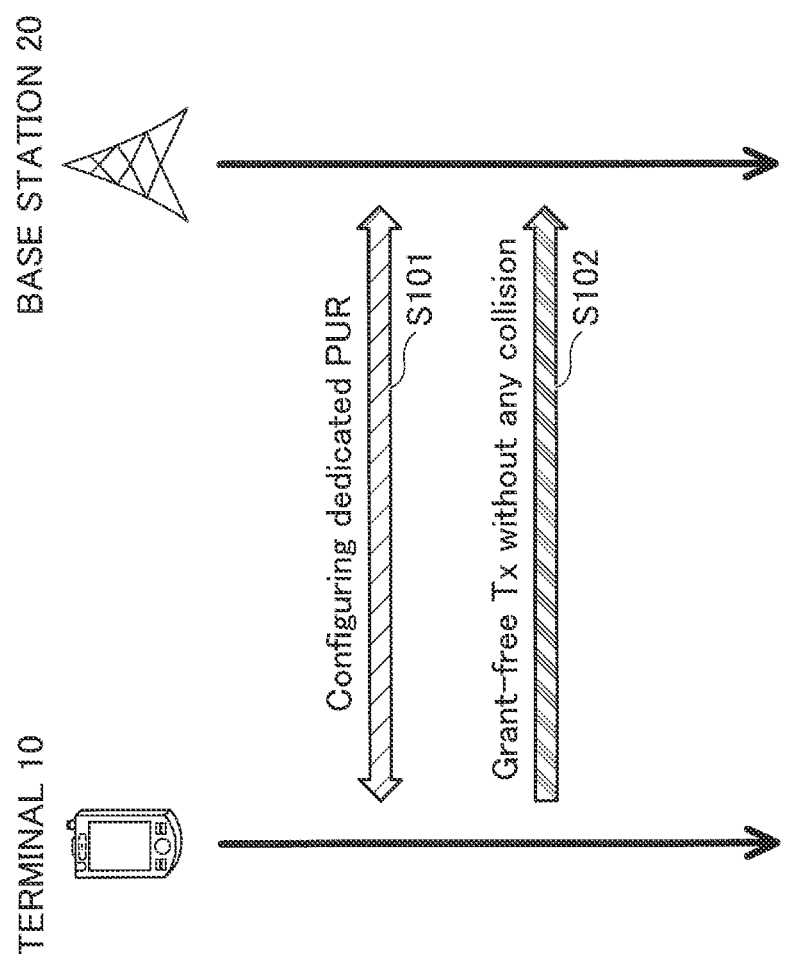
FIG. 3 is a diagram illustrating an example of a data transmission operation by a terminal using a Dedicated PUR.

FIG. 3 is a diagram illustrating an example of a data transmission operation by the terminal 10 using a Dedicated PUR. First, in step S101, the terminal 10 and the base station 20 configure the Dedicated PUR. Subsequently, at a desired timing of timings to which respective Dedicated PURs are configured, the terminal 10 transmits data using the corresponding Dedicated PUR (step S102). For transmitting the data, the terminal 10 may transmit data in an idle mode.

Figure 4:
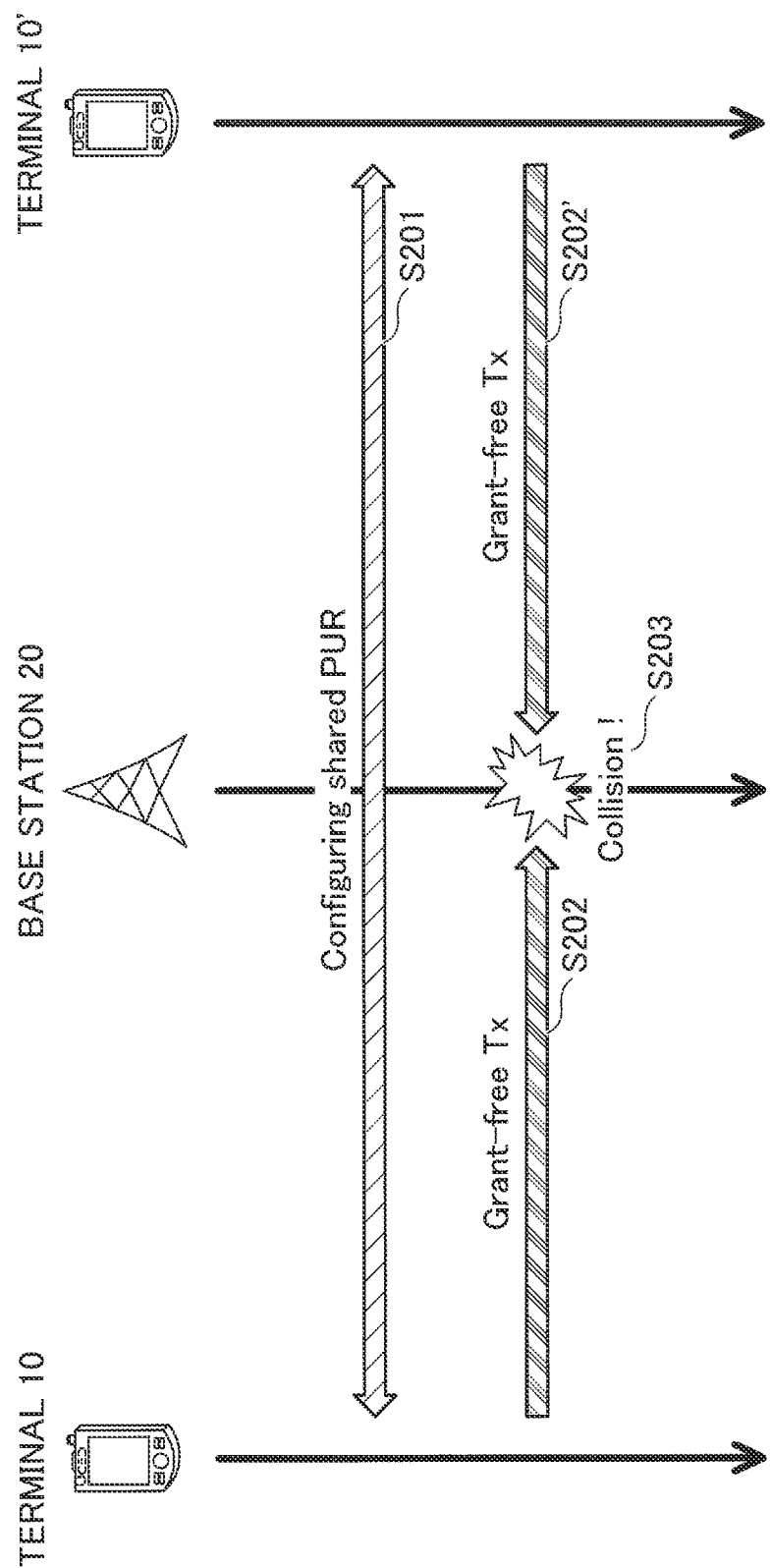
FIG. 4 is a diagram illustrating an example of a data transmission operation by a terminal using a CBS PUR.

FIG. 4 is a diagram illustrating an example of a data transmission operation by the terminal 10 using a CBS PUR. First, in step S201, the plurality of terminals 10 and the base station 20 configure the shared PUR. Next, in step S202, the terminal 10 transmits data using the shared PUR. At this time, in step S202', the terminal 10' transmits data using the shared PUR. In this case, in step S203, a collision between data transmitted from the terminal 10 and data transmitted from the terminal 10' occurs in the base station 20. Accordingly, the base station 20 subsequently performs a contention resolution procedure. For example, the base station 20 may indicate the terminal 10 to retransmit data using a PUR at a specified timing.

Figure 5:
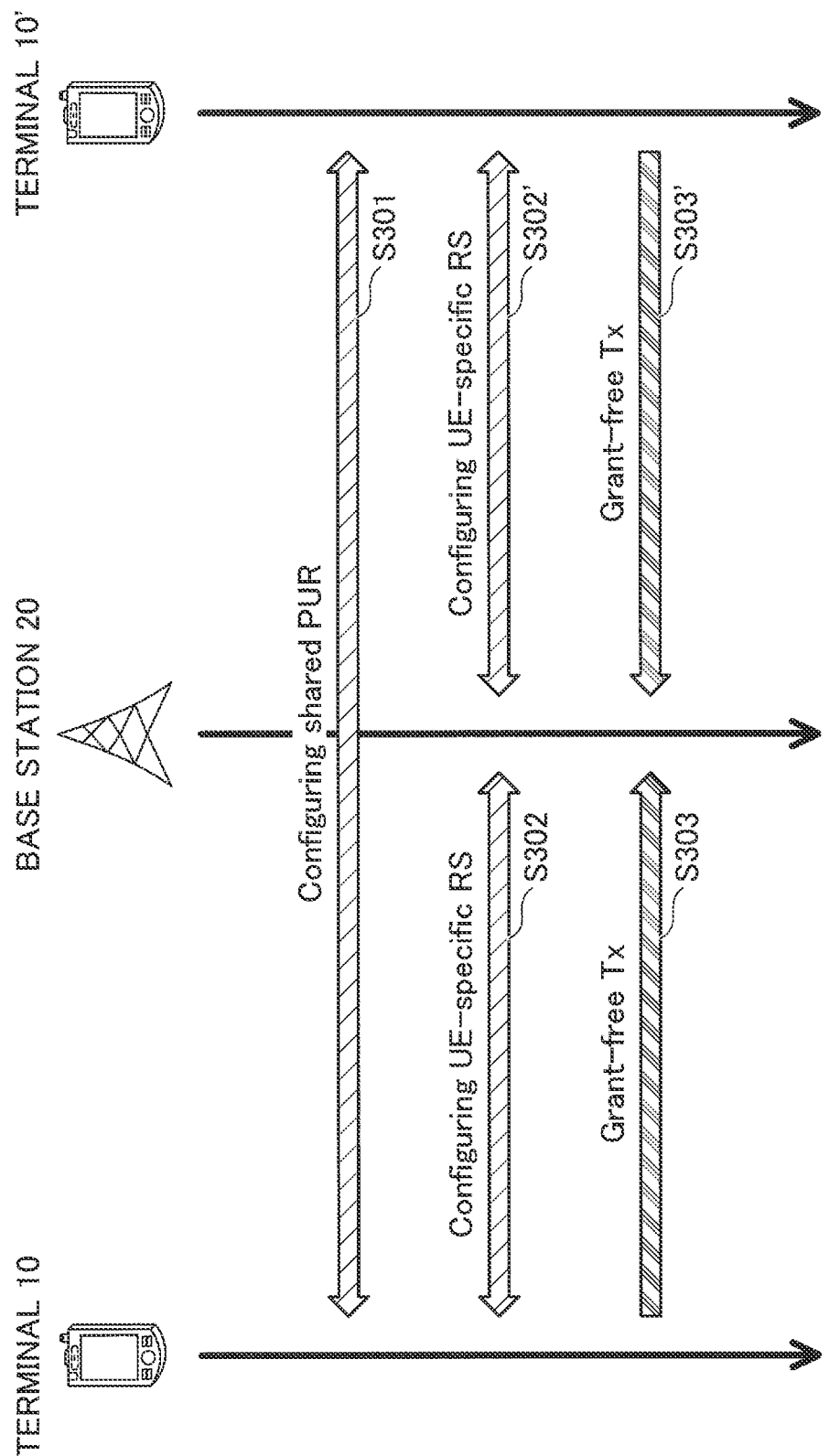
FIG. 5 is a diagram illustrating an example of a data transmission operation by a terminal using a CFS PUR.

FIG. 5 is a diagram illustrating an example of a data transmission operation by the terminal 10 using a CFS PUR. First, in step S301, the plurality of terminals 10 and the base station 20 configure a shared PUR. Next, in step S302, the terminal 10 and the base station 20 configures a resource specific to the terminal 10 (in step S302', the terminal 10' and the base station configures a resource specific to the terminal 10'). Next, in step S303, the terminal 10 transmits data using the PUR configured in step S301 and the resource specific to the terminal 10 configured in step S302. At this time, in step S303', the terminal 10' transmits data using the PUR configured in step S301 and the resource specific to the terminal 10' configured in step S302'. Here, since a resource specific to the terminal 10 is used for the data transmission by the terminal in step S303 and a resource specific to the terminal 10' is used for the data transmission by the terminal 10' in step S303', the base station 20 can separately receive the data transmitted from the terminal 10 and the data transmitted from the terminal 10' without performing contention resolution. For example, the spreading code specific to the terminal 10 may be used as a resource specific to the terminal 10, and the spreading code specific to the terminal 10' may be used as a resource specific to the terminal 10'.

(PDCCH Scheduling for Preconfigured UL Resources)

As in the above-described operation example, currently, an operation is unknown for the terminal 10 in an idle mode to receive transmission acknowledgement information (ACK/NACK) transmitted from the base station 20 after transmitting data without a grant from the base station 20. It is assumed that the mode of the terminal 10 remains in the idle mode after transmitting the data, so that it is unknown how the terminal 10 receives the transmission acknowledgement information in this case. There is a need for a method for the terminal 10 in an idle mode to receive transmission acknowledgement information transmitted from the base station 20.

(Solution 1)

The terminal 10 may use a paging search space to receive transmission acknowledgement information transmitted from base station 20. In general, the terminal 10 in an idle mode is required to monitor a paging signal and a broadcast signal. Accordingly, the terminal 10 in an idle mode may detect and receive transmission acknowledgement information transmitted from the base station 20 by monitoring the paging search space after transmitting the data using a PUR.

However, the terminal 10 in an idle mode usually uses Discontinuous Reception (DRX) to reduce energy consumption. In this case, the terminal 10 monitors one paging occasion (PO) per DRX cycle. Here, PO is a set of Physical Downlink Control Channel (PDCH) monitoring occasions and consists of a plurality of time slots (e.g., subframes or OFDM symbols) in which Downlink Control Information (DCI) may be transmitted. One paging frame (PF) is a single radio frame that includes one or more POs or includes a starting point for POs.

As described above, when the terminal 10 uses DRX and transmits data immediately after the terminal 10 monitors the PO in the DRX cycle, the occasion at which the terminal 10 can receive the transmission acknowledgement information is a PO of the next DRX cycle. For example, the occasion at which the terminal 10 can receive the transmission acknowledgement information may occur after a relatively long period of time, such as 40 minutes after the data is transmitted.

(Solution 2)

Figure 6:
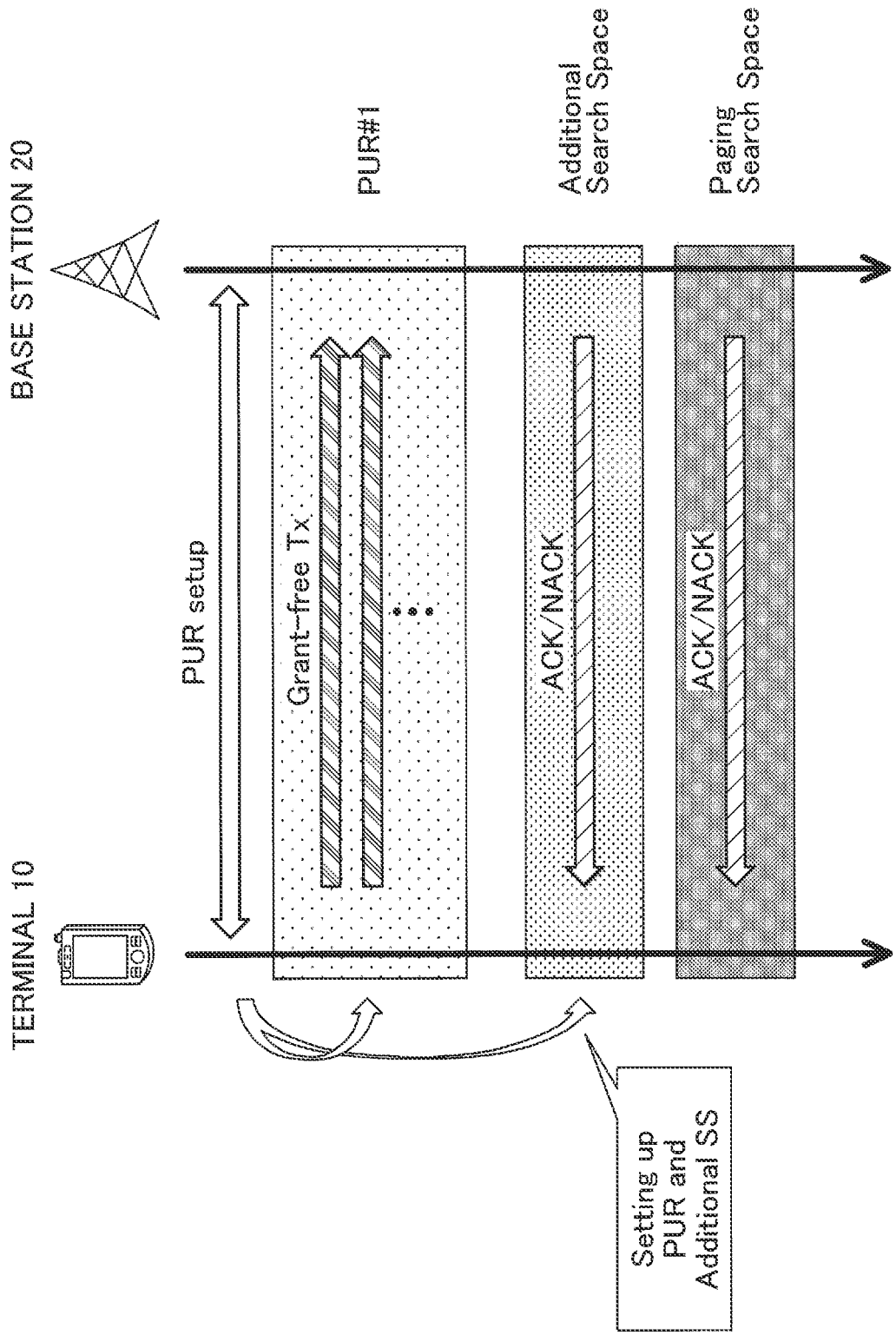
FIG. 6 is a diagram illustrating an example of configuring additional search space in addition to a search space for paging.

As a solution other than the solution 1, a method can be considered in which an additional search space is defined for the terminal 10 to receive transmission acknowledgement information for transmission of data by the terminal 10 using a PUR. Then, by configuring the terminal 10 so that the terminal 10 in an idle mode monitors the additional search space in addition to the paging search space, the terminal 10 in an idle mode can be caused to receive transmission acknowledgement information. FIG. 6 illustrates an example of configuring an additional search space in addition to the paging search space.

For example, a network can configure a search space to be monitored by the terminal 10. For example, if a PUR is configured for the terminal 10, the terminal 10 may be configured to monitor only the paging search space. Alternatively, the terminal 10 may be configured to monitor only an additional search space. Alternatively, the terminal 10 may be configured to monitor the paging search space and the additional search space.

As a method of allocating an additional search space, a method can be configured such that, for example, if a PUR is periodically configured, the additional search space is allocated with periodicity that is the same as the periodicity of the PUR. For example, an additional search space may be placed immediately after a PUR. Alternatively, an additional search space may be placed between one PUR and another PUR. Namely, a position at which an additional search space is placed may be specified as a relative position from the PUR. An additional search space may also be allocated while being associated with allocation of the PUR. For example, one additional search space may be placed for two sets of PURs. For example, when a PUR is configured between the terminal 10 and the base station 20, allocation of an additional search space may be configured. Namely, configuration information of the PUR may include configuration information of the additional search space. If the PUR is configured periodically, a time position (time occasion) of the additional search space may be associated with a time position of the PUR, or periodicity of the additional search space may be associated with periodicity of the PUR or may be the same as the periodicity of the PUR. As an Radio Network Temporary Identifier (RNTI) used to monitor an additional search space, RNTI for paging may be used, or RNTI assigned in a connected mode may be continuously used in an idle mode. Alternatively, RNTI dedicated for an additional search space may be defined, and the RNTI dedicated for the additional search space may be used to perform blind decoding in the additional search space.

Operation Example 1

As described above, a PO is a set of PDCCH monitoring occasions and consists of a plurality of time slots (e.g., subframes or OFDM symbols) in which a DCI can be transmitted. One paging frame (PF) is a radio frame that includes one or more POs or includes a starting point for POs.

FIG. 7 is a diagram illustrating an example of an operation in which, when a PUR is configured between the base station 20 and the terminal 10, and when the terminal 10 uses DRX, the terminal 10 receives transmission acknowledgement information. The terminal 10 monitors one paging occasion (PO) included in one paging frame for each DRX cycle.

First, in step S401, the base station 20 and the terminal 10 configure a PUR for data transmission by the terminal 10.

Next, in the first DRX cycle, a paging frame occurs (step S402). Subsequently, in the same DRX cycle, the terminal 10 transmits data using the PUR (step S403). In step S404 in the same DRX cycle, the terminal 10 monitors an additional search space and receives transmission acknowledgement information for the data transmitted in step S403.

Here, the base station 20 may select whether to transmit the transmission acknowledgement information with respect to the data received in step S403 in the additional search space or in the paging search space. Step S404 corresponds to a case in which the base station 20 selects to transmit the transmission acknowledgement information in the additional search space. If the base station 20 selects to transmit the transmission acknowledgement information only in the paging search space, the transmission acknowledgement information is not transmitted in step S404, and the base station 20 transmits the transmission acknowledgement information in a PF in the next DRX cycle. In the PO included in the PF in the DRX cycle, the terminal 10 receives the transmission acknowledgement information (step S405).

In the above-described operation example, a case is descried in which the additional search space in step S404 and the paging search space in step S405 are configured in respective separate subframes. However, embodiments of the present invention are not limited to this operation example. For example, an additional search space and a paging search space may be allocated in the same subframe. Here, an upper limit is defined for a number of times of PDCCH blind decoding in one subframe. Accordingly, when an additional search space and a paging search space are allocated in the same subframe, a sum of a number of times of blind decoding in the additional search space and a number of times of blind decoding in the paging search space may be set to be less than or equal to the above-described upper limit. A method may be considered such that, if a paging search space is already configured in a subframe and an additional search space is configured in the same subframe, a number of times of blind decoding provided for the paging search space may be reduced and allocated as a number of times of blind decoding in the additional search space. As a result, the sum of the number of times of blind decoding in the additional search space and the number of times of blind decoding in the paging search space can be less than or equal to the above-described upper limit value.

Operation Example 2

FIG. 8 is a diagram illustrating an operation example such that, when a PUR is configured between the base station 20 and the terminal 10, and when the terminal 10 uses extended Discontinuous Reception (eDRX), the terminal 10 receives the transmission acknowledgement information. The eDRX enhances battery saving effect by lengthening a sleep state of the terminal 10. Multiple POs are configured within a single eDRX cycle. Since an eDRX cycle is longer than a normal DRX cycle, the terminal 10 only monitors POs included within a Paging Hyperframe (PH). A PF located outside the PH is in an invalid state, and the terminal 10 using the eDRX does not need to monitor such PF. In this case, because PF and PO are already defined, for allocating the additional search space, a PO of an unused PF may be the additional search space.

In the example of FIG. 8, first, in step S501, the terminal 10 and the base station 20 configure a PUR for data transmission by the terminal 10. In step S502, a PH occurs and the terminal 10 monitors the PO in the PH. In step S503, the terminal 10 transmits data using a PUR. In step S504, the terminal 10 monitors the additional search space configured for PO outside PH and receives transmission acknowledgement information.

Here, the base station 20 may select whether to transmit the transmission acknowledgement information with respect to the data received in step S503 in the additional search space or in the paging search space. Step S504 corresponds to a case in which the base station 20 selects to transmit the transmission acknowledgement information in the additional search space. If the base station 20 selects to transmit the transmission acknowledgement information only in the paging search space, the transmission acknowledgement information is not transmitted in step S504, and the base station 20 transmits the transmission acknowledgement information in PO included in PH in the next eDRX cycle. In the PO included in the PH in this eDRX cycle, the terminal 10 receives the transmission acknowledgement information (step S505).

(Release Mechanism for Preconfigured UL Resource)

In the above-described example, a PUR is configured between the base station 20 and the terminal 10, and a data transmission is performed by the terminal 10 using the PUR. In the following example, a method of releasing a configured PUR is described.

Here, for example, as a method of releasing Dedicated PUR, a method of releasing a resources configured in Semi-Persistent Scheduling (SPS) in the existing LTE can be applied. An example of this method is described with reference to FIG. 9A and FIG. 9B.

Figure 9A:
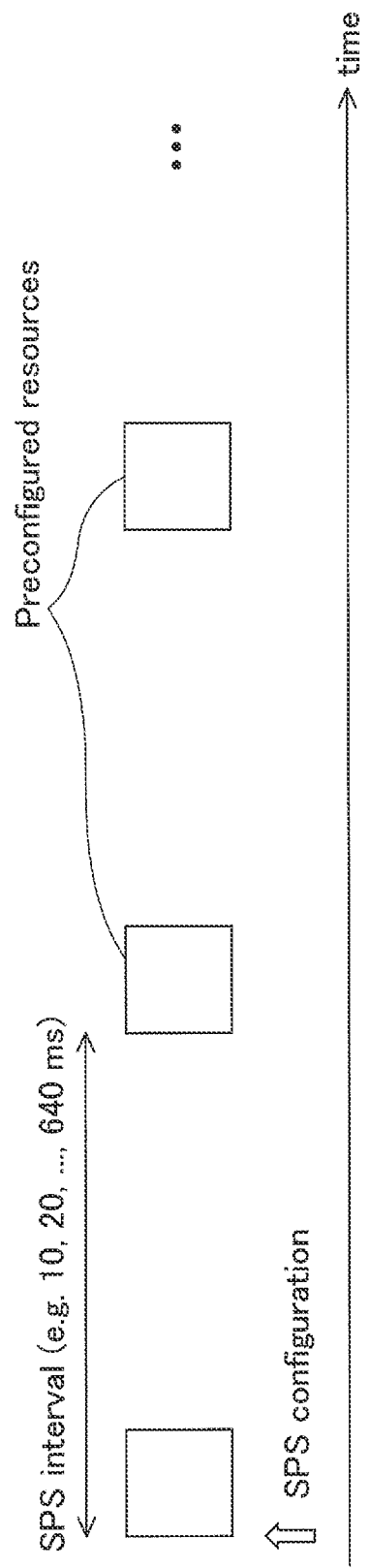
FIG. 9A is a diagram illustrating an example of resource allocation in UL SPS of LTE.
Figure 9B:
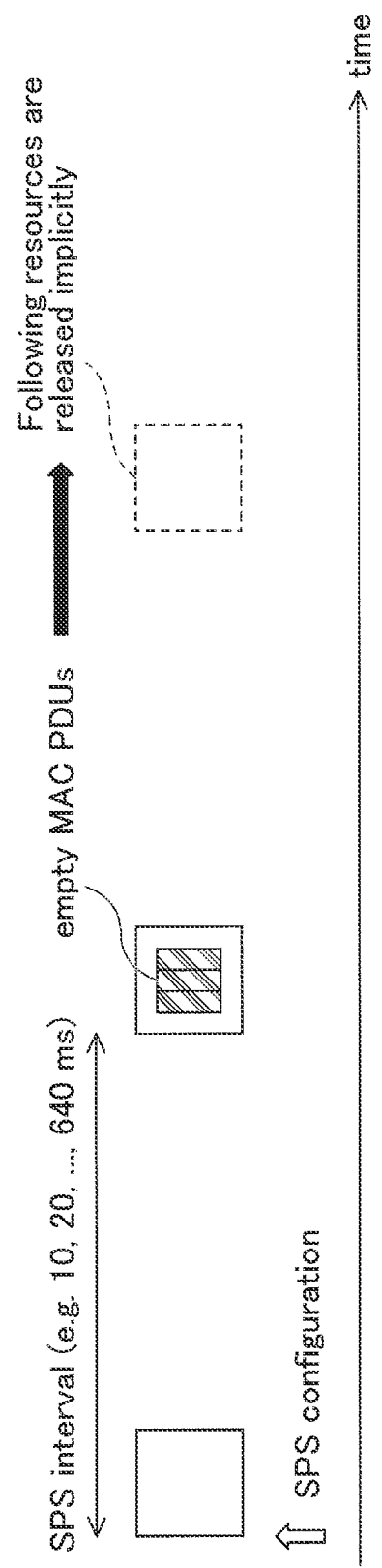
FIG. 9B is a diagram illustrating an example of a method of releasing SPS resources.

FIG. 9A is a diagram illustrating an example of SPS resource allocation in LTE UL. FIG. 9A illustrates an example in which a resource for UL data transmission is periodically allocated to the terminal 10. FIG. 9B illustrates a method of releasing a semi-persistently allocated resource illustrated in the example of FIG. 9A by creating, by the terminal 10, a packet formed of zeros at a Medium Access Control (MAC) level and by repeatedly transmitting the packet. In response to detecting that a predetermined number of empty MAC Protocol Data Units (PDUs), i.e., MAC PDUs not including a MAC Service Data Unit (SDU) is transmitted from the terminal 10, the network implicitly detects that there is no data to be transmitted by the terminal 10, and the network releases the semi-persistently allocated resource. By applying such a method, for example, by a method of implicit signaling to the network side using a physical layer signal, the terminal 10 may release a PUR.

As another method of releasing a configured PUR, for example, a method can be considered such that, by transmitting, by the network, a Radio Resource Control (RRC) connection reconfiguration message to the terminal 10, the PUR is released. However, the mode of the terminal 10 using the PUR is assumed to be the idle mode, and it is considered that the terminal 10 in the idle mode is usually unable to monitor an RRC message. Accordingly, in order to apply this method, a system design change may be required.

It can be considered that a method using implicit signaling, such as the example illustrated in FIG. 9B, can be applied to the terminal 10 in an idle mode without significant system design changes. Accordingly, the method using implicit signaling can be considered to be advantageous over a method using an RRC message.

Figure 10:
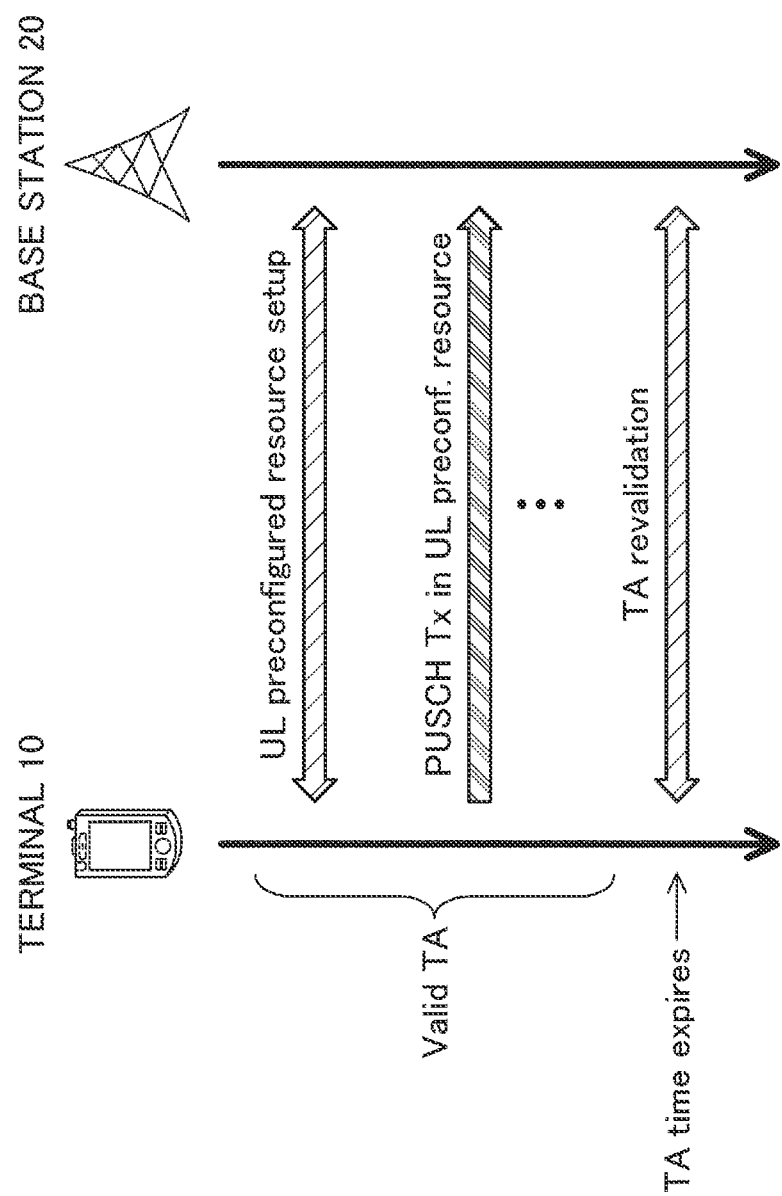
FIG. 10 is a diagram illustrating an example of a method of revalidating whether TA is valid when a TA timer expires.

As for transmission of data using PUR, currently, a method of validating (Validation) a timing advance (TA) for the terminal 10 in an idle mode has been studied. In order for the terminal 10 in an idle mode to transmit data using PUR, it is necessary for the terminal 10 to maintain a valid TA. Accordingly, as illustrated in FIG. 10, a method of revalidating the TA is required when a TA timer retained by the terminal 10 expires.

As for the validation of the TA, in the 3GPP meeting, the following items are currently agreed.
 (1) If a serving cell is changed, a TA previously considered to be valid is no longer a valid TA.
 (2) A time alignment timer is currently defined, and a TA maintained by the terminal 10 is valid only during operation of the time alignment timer. The Time Alignment Timer may be used only by the terminal 10 in a connected mode. However, this is extended, so that the terminal 10 in an idle mode can use it.

(3) The terminal 10 measures reference signal received power (RSRP) of a serving cell. If the RSRP of the serving cell significantly changes, the TA previously maintained by the terminal 10 is no longer a valid TA.

If the terminal 10 completes data transmission and releases a PUR, the PUR can be released, at least, by the above-described method of using implicit signaling.

Except for a case in which the terminal 10 completes data transmission, there may be a case in which the terminal 10 determines that a TA maintained up to that time is no longer valid, in response to detecting, by the terminal 10 in an idle mode, expiration of the Time Alignment Timer, or a change in RSRP. In this case, the terminal 10 may apply a fallback procedure to obtain a valid TA via a RACH procedure/EDT procedure. As described above, it can be considered that, if the terminal 10 can obtain a valid TA again, it is possible to use the PUR configured for the terminal 10.

Figure 11:
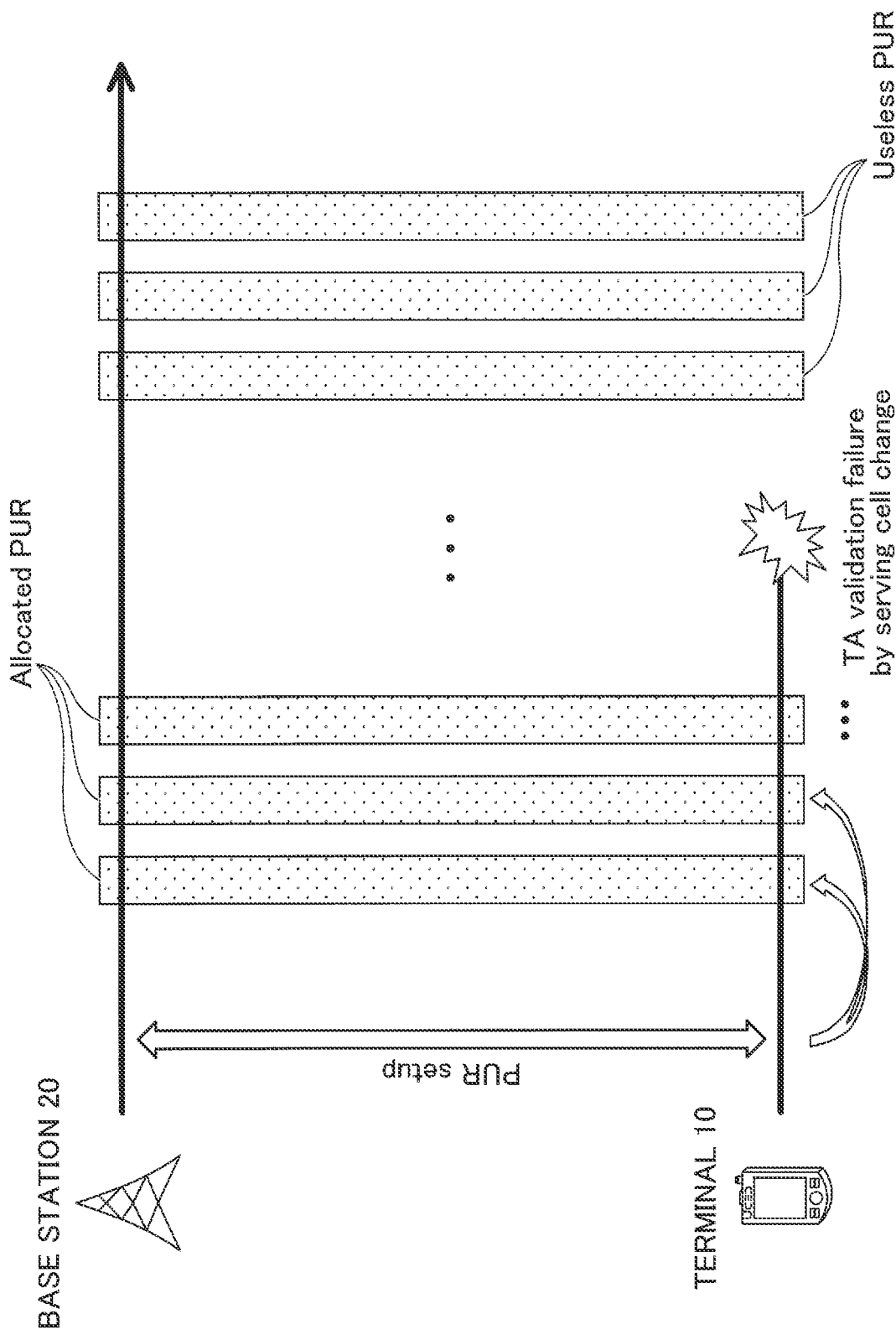
FIG. 11 is a diagram exemplifying necessity to release PUR.

As another case, for example, a case, such as that illustrated in FIG. 11, can be considered. There is a need for a method of efficiently releasing a PUR when a serving cell of the terminal 10 is changed or when an uplink radio link is lost. For example, suppose that the terminal 10 to which a PUR has been assigned is suddenly surrounded by a shield and an uplink radio link is lost. In this case, the base station 20 may be unable to determine whether the terminal 10 transitions to a sleep mode because there is no data to be transmitted in the terminal 10, or the terminal 10 is in a state in which the terminal 10 moves to another cell and is unable to use the PUR. In this case, the PUR assigned to the terminal 10 may be wasted. There is a need for a method of releasing such wasted PUR.

(Alt. 1)

In the above-described example, the base station 20 is in a state in which the base station 20 does not know whether the terminal 10 can use the PUR or the terminal 10 is unable to use the PUR. The terminal 10 is unable to use the PUR. An example of a method for releasing a wasted PUR in such a case is described below. As an example of such a method, a method can be considered in which the terminal 10 constantly transmits uplink data on the PUR to indicate presence of the terminal 10 (the terminal 10 is in a state in which the PUR can be used).

Figure 12:
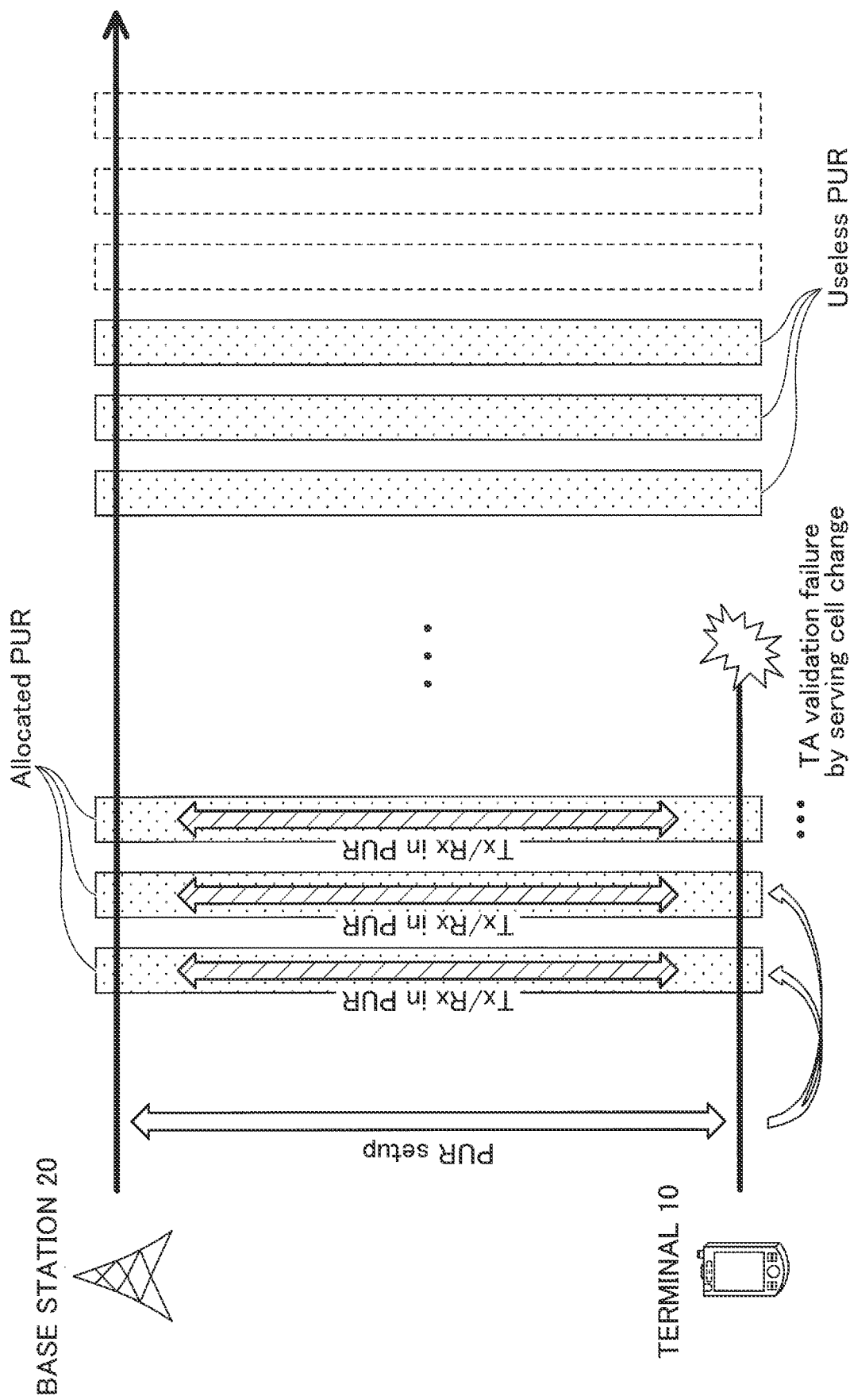
FIG. 12 is a diagram illustrating an example in which uplink data is constantly transmitted with PUR while TA is valid.

For example, as illustrated in FIG. 12, the terminal 10 constantly transmits uplink data on a PUR while a TA is valid. However, if, for example, the TA becomes invalid due to a change in the serving cell, the terminal 10 stops transmitting uplink data. The base station 20 that detects that uplink data is not transmitted on the PUR releases the PUR (the base station 20 may release the PUR if the uplink data is not detected on the PUR). Here, the base station 20 may start counting PURs from the PUR on which the terminal 10 does not transmit uplink data, and may release the PURs when the number of the PURs on which the uplink data is not transmitted from the terminal 10 reaches a predetermined number. Note that the base station 20 may count a number of times of not detecting uplink data.

(Alt. 2)

For IoT, it may be undesirable to constantly transmit data on a PUR from a perspective of power reduction. As an alternative example, the terminal 10 may skip transmission of uplink data using the PUR. After transmitting data using a specific PUR among a plurality of PURs arranged on a time axis, the terminal 10 is allowed to skip transmitting data on a consecutive predetermined number of PURs. For example, after transmitting data on a specific PUR among a plurality of PURs arranged on a time axis, the terminal 10 may transmit data on every fifth PUR. Namely, the terminal 10 may transmit uplink data on PURs with a predetermined frequency among a plurality of PURs to indicate the presence of the terminal 10.

In this case, for example, while TA is valid, the terminal 10 transmits uplink data on PURs with a predetermined frequency. However, if, for example, the TA becomes invalid due to a change in the serving cell, the terminal 10 stops transmitting uplink data. The base station 20, which detects that uplink data is not transmitted on the PURs with the predetermined frequency, releases the PUR. Here, the base station 20 may start counting PURs with the predetermined frequency from the PUR on which no uplink data is transmitted from the terminal 10 (no uplink data is detected), and the base station may release the PUR at a time point at which a number of PURs on which no uplink data is transmitted from the terminal 10 (no uplink data is detected) reaches a predetermined number.

Note that the network may be capable of configuring the terminal 10 as to whether the terminal 10 constantly transmits uplink data on PUR or the terminal 10 transmits uplink data on PURs with a predetermined frequency.

As described above, the terminal 10 can use a PUR to transmit uplink data only if it has a valid TA. A specific type of terminal 10 is capable of validating a TA maintained by the terminal 10, and if, as a result, the TA is determined to be invalid, the terminal 10 can revalidate the TA. For example, the terminal 10 may apply a fallback procedure to obtain a valid TA through a RACH procedure/a EDT procedure.

Currently, validation of a TA has been studied, and at the 3GPP meeting, the following items have been agreed at this stage.

In determining whether the terminal 10 in an idle mode validates a TA, it has been agreed at least that the terminal 10 considers the following conditions (TA validation attributes).

(Condition 1) Subscription condition (subscription based validation). For example, when a specific terminal 10 is always used in a stationary state, a case can be considered such that a TA of the terminal 10 is deemed as always valid.

(Condition 2) A change of a serving cell. Here, the serving cell is a cell in which the terminal 10 camps on, the terminal 10 completes cell selection or cell reselection, and the terminal 10 monitors system information and paging information in the cell.

(Condition 3) A state of a Time Alignment Timer in an idle mode.

(Condition 4) A change in Reference Signal Received Power (RSRP) of the serving cell.

(Condition 5) Conditions other than the above-described conditions.

In addition to each of the above-described conditions, the following conditions may be considered as additional conditions for determining whether to validate a TA, in order to enable flexible responses on the network side.

For a terminal 10 that is always used in a stationary state, it is considered that there are many cases in which condition 1 is sufficient as a condition for determining whether to validate a TA. However, depending on the operation on the network side, other conditions may be applied in addition to condition 1. For example, the terminal 10 may ignore a TA timer based on condition 1 and the terminal 10 checks a change in the RSRP based on condition 4.

When the terminal 10 is not always used in a stationary state, condition 4 may be considered an appropriate condition for determining whether to validate a TA. If condition 4 is satisfied as a condition for determining whether to validate a TA, one or more other conditions may be applied (e.g., the condition 2 may be applied). Alternatively, any condition other than condition 1 (condition 2, condition 3, condition 4, and/or condition 5) may be configured in the terminal 10 after deactivating condition 1 as a condition for determining whether to validate a TA.

With respect to a condition for determining whether to validate a TA for the terminal 10 in an idle mode to transmit uplink data using a PUR, the terminal 10 may independently activate or deactivate each of the above-described conditions 1 to 5.

Alternatively or additionally, possible combinations of conditions 1-5 described above may be specified in a specification, as conditions to determine whether to validate a TA for the terminal 10 in an idle mode to transmit uplink data using a PUR. In this case, a dependency (or priority) among multiple conditions may be specified in the specification in possible combinations of conditions 1-5 as described above.

Information indicating the above-described conditions 1 to 5 (or information representing any of the above-described conditions 1 to 5) may be transmitted from the base station 20 to the terminal 10. Information indicating the above-described conditions 1 to 5 (or information indicating any of the above-described conditions 1 to 5) may be transmitted from the terminal 10 to the base station 20.

Any one of the above-described conditions 1 to 5 may depend from another of the above-described conditions 1 to 5.

For example, if a serving cell is changed (i.e., the condition 2 is satisfied), regardless of other conditions, the terminal 10 may assume that the TA maintained by the terminal 10 is invalid.

As another example, even if RSRP does not change for a predetermined time (i.e., the condition 4 is not met), the terminal 10 may assume that a TA maintained by the terminal 10 is invalid in response to expiration of a Time Alignment Timer in an idle mode (the condition 3 is met).

As another example, if, for example, the subscription condition (subscription based validation) is configured for the terminal 10, the terminal 10 may determine not to validate a TA even if any of the conditions 2 to 5 is satisfied.

In possible combinations of the above-described conditions 1-5, the dependencies (or priorities) among the multiple conditions may be configured by higher layer signaling from the base station 20 or may be specified by a specification.

(Device Configuration)

Next, a functional configuration example of the base station 20 and the terminal 10 for performing the processes and operations described above is described. The base station 20 and the terminal 10 include functions for implementing the above-described embodiments. However, each of the base station 20 and the terminal 10 may include only a part of the functions in the embodiments. The terminal 10 and the base station 20 may be collectively referred to as a communication device.

<Terminal>

Figure 13:
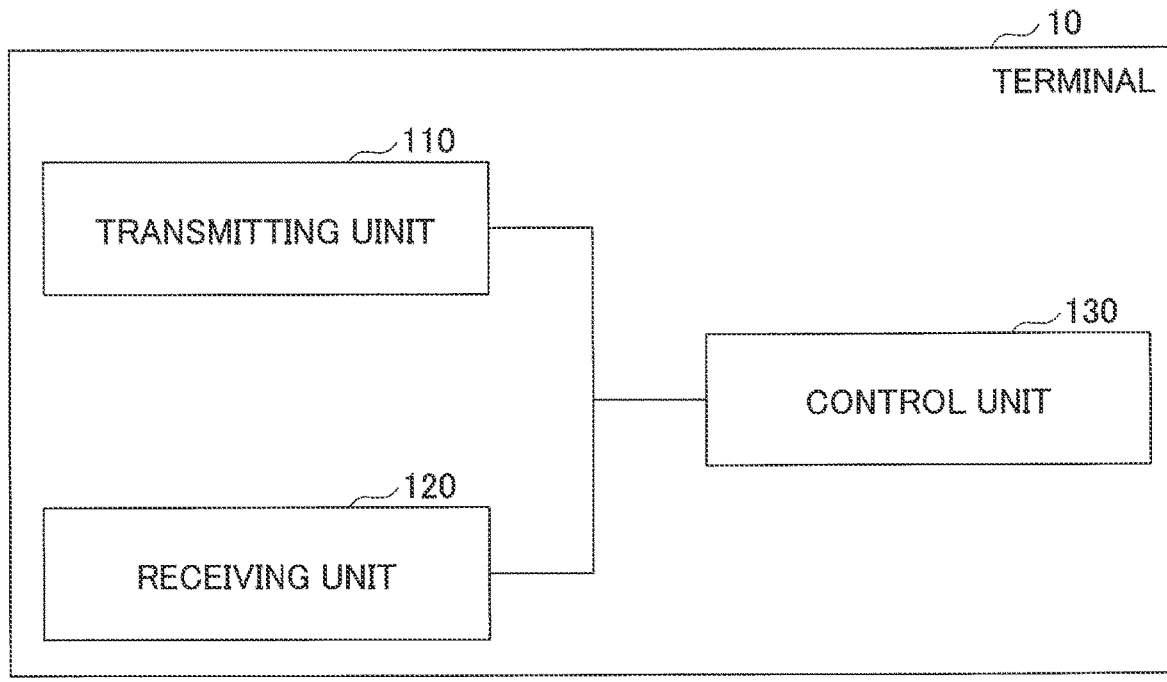
FIG. 13 is a diagram illustrating an example of a functional configuration of a terminal 10.

FIG. 13 is a diagram illustrating an example of a functional configuration of the terminal 10. As illustrated in FIG. 13, the terminal 10 includes a transmitting unit 110, a receiving unit 120, and a control unit 130. The functional configuration illustrated in FIG. 13 is merely an example. The functional division and names of functional units may be any division and names, provided that the operation according to the embodiments of the present invention can be performed.

The transmitting unit 110 creates a transmission signal from transmission data and transmits the transmission signal through radio. The receiving unit 120 receives various types of signals wirelessly and obtains higher layer signals from the received physical layer signals. Furthermore, the receiving unit 120 includes a measurement unit that measures a received signal to obtain received power, etc.

The control unit 130 performs control of the terminal 10. The function of the control unit 130 related to transmission may be included in the transmitting unit 110, and the function of the control unit 130 related to reception may be included in the receiving unit 120.

In the terminal 10, for example, the transmitting unit 110 may transmit a signal requesting the base station 20 to configure a PUR. The receiving unit 120 may receive the assignment information of the PUR transmitted from the base station 20. The control unit 130 may store the assignment information of the PUR received by the receiving unit 120 and assign the PUR for transmitting the data according to the stored assignment information when the data to be transmitted is generated. The transmitting unit 110 may transmit data to the base station 20 using the PUR assigned by the control unit 130.

The control unit 130 configures (may preconfigure) one or more conditions of the above-described conditions 1 to 5 for the terminal 10 as a condition for determining whether the terminal 10 in an idle mode validates a TA. The control unit 130 independently activates or deactivates each of the above-described conditions 1 to 5. The control unit 130 configures a possible combination of the above-described conditions 1 to 5 for the terminal 10. The control unit 130 configures dependency (or priority) among a plurality of conditions for the terminal 10 in possible combinations of the above-described conditions 1 to 5.

The receiving unit 120 receives information indicating the above-described conditions 1 to 5 (or information indicating any of the above-described conditions 1 to 5) from the base station 20. The transmitting unit 110 transmits information indicating the above-described conditions 1 to 5 (or information indicating any of the above-described conditions 1 to 5) to the base station 20. The receiving unit 120 receives information indicating a possible combination among the above-described conditions 1 to 5 from the base station 20, and the control unit 130 may configure the possible combination for the terminal 10. The receiving unit 120 also receives information indicating the dependency among a plurality of conditions in possible combinations of the above-described conditions 1 to 5, and the control unit 130 may configure the dependency among the plurality of conditions in the possible combinations for the terminal 10.

<Base Station 20>

Figure 14:
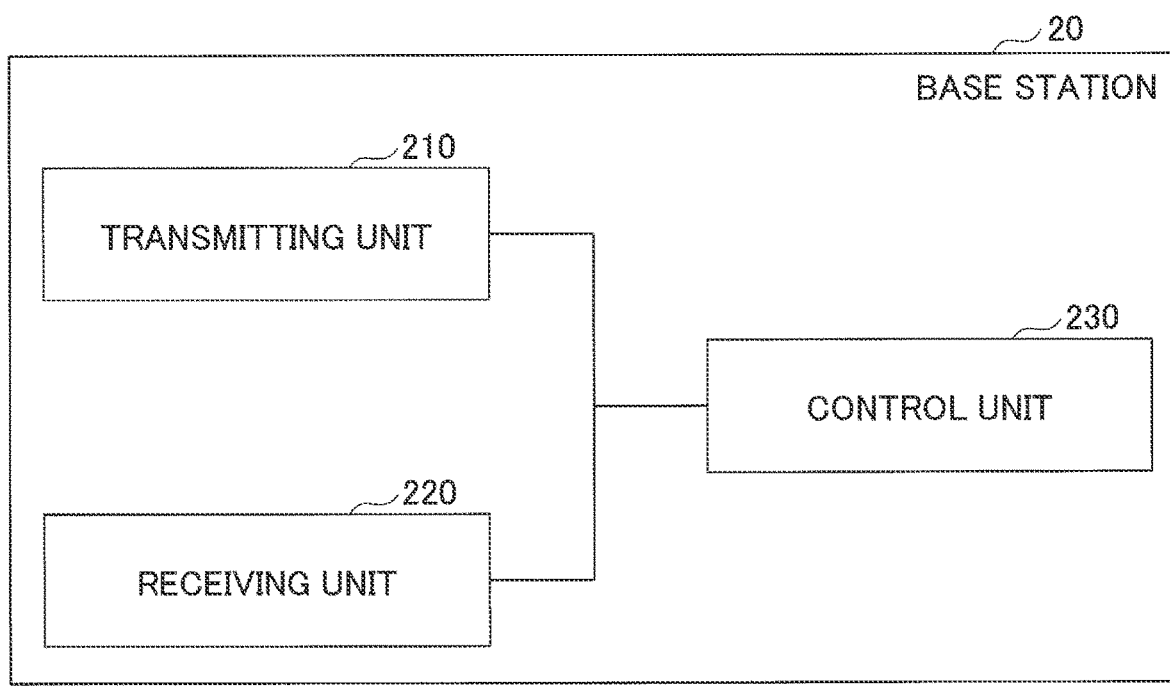
FIG. 14 is a diagram illustrating an example of a functional configuration of a base station 20.

FIG. 14 is a diagram illustrating an example of a functional configuration of the base station 20. As illustrated in FIG. 14, the base station 20 includes a transmitting unit 210, a receiving unit 220, and a control unit 230. The functional configuration illustrated in FIG. 14 is only one example. The function division and the names of the functional units may be any division and names, provided that the operation according to the embodiment can be implemented.

The transmitting unit 210 includes a function for generating a signal to be transmitted to the terminal 10 and transmitting the signal through radio. The receiving unit 220 includes a function for receiving various signals transmitted from the terminal 10 and obtaining, for example, information of a higher layer from the received signals. The receiving unit 220 includes a measurement unit that measures a received signal to obtain received power, etc.

The control unit 230 controls the base station 20. The function of the control unit 230 related to transmission may be included in the transmitting unit 210, and the function of the control unit 230 related to reception may be included in the receiving unit 220.

In the base station 20, for example, the receiving unit 220 may receive a signal requesting to configure a PUR from the terminal 10. The control unit 230 may create assignment information of the PUR for the terminal 10 in response to receiving, by the receiving unit 220, the signal requesting to configure the PUR from the terminal 10. The transmitting unit 210 may transmit the assignment information of the PUR to the terminal 10.

The control unit 230 may calculate a Timing Advance assigned to the terminal 10, and the transmitting unit 210 may transmit the Timing Advance Command representing the calculated Timing Advance to the terminal 10.

The control unit 230 generates the above-described conditions 1 to 5 as conditions to be considered for determining whether the terminal 10 in an idle mode validates a TA, and the transmitting unit 210 may transmit information indicating the above-described conditions 1 to 5 to the terminal 10. The control unit 230 may create information (which may be an index) representing possible combinations among the above-described conditions 1 to 5 as conditions for determining whether to perform the verification of TA for the terminal 10 in the idle mode to transmit uplink data using the PUR, and the transmitting unit 210 may transmit information representing the possible combinations to the terminal 10. The control unit 230 may create dependency (or priority) among the plurality of conditions in the above-described possible combinations, and the transmitting unit 210 may transmit information indicating the dependency (or priority) to the terminal 10.

<Hardware Configuration>

The block diagrams (FIG. 13 to FIG. 14) used for the description of the above embodiments show blocks of functional units. These functional blocks (components) are implemented by any combination of at least one of hardware and software. In addition, the implementation method of each functional block is not particularly limited. That is, each functional block may be implemented using a single device that is physically or logically combined, or may be implemented by directly or indirectly connecting two or more devices that are physically or logically separated (e.g., using wire, radio, etc.) and using these multiple devices. The functional block may be implemented by combining software with the above-described one or more of the above-described devices. Functions include, but are not limited to, judgment, decision, determination, computation, calculation, processing, derivation, research, search, verification, reception, transmission, output, access, resolution, choice, selection, establishment, comparison, assumption, expectation, deeming, broadcasting, notifying, communicating, forwarding, configuring, reconfiguring, allocating, mapping, assigning, and so forth. For example, a functional block (component) that functions to transmit may be referred to as a transmitting unit or a transmitter. In either case, as described above, the implementation method is not particularly limited.

Figure 15:
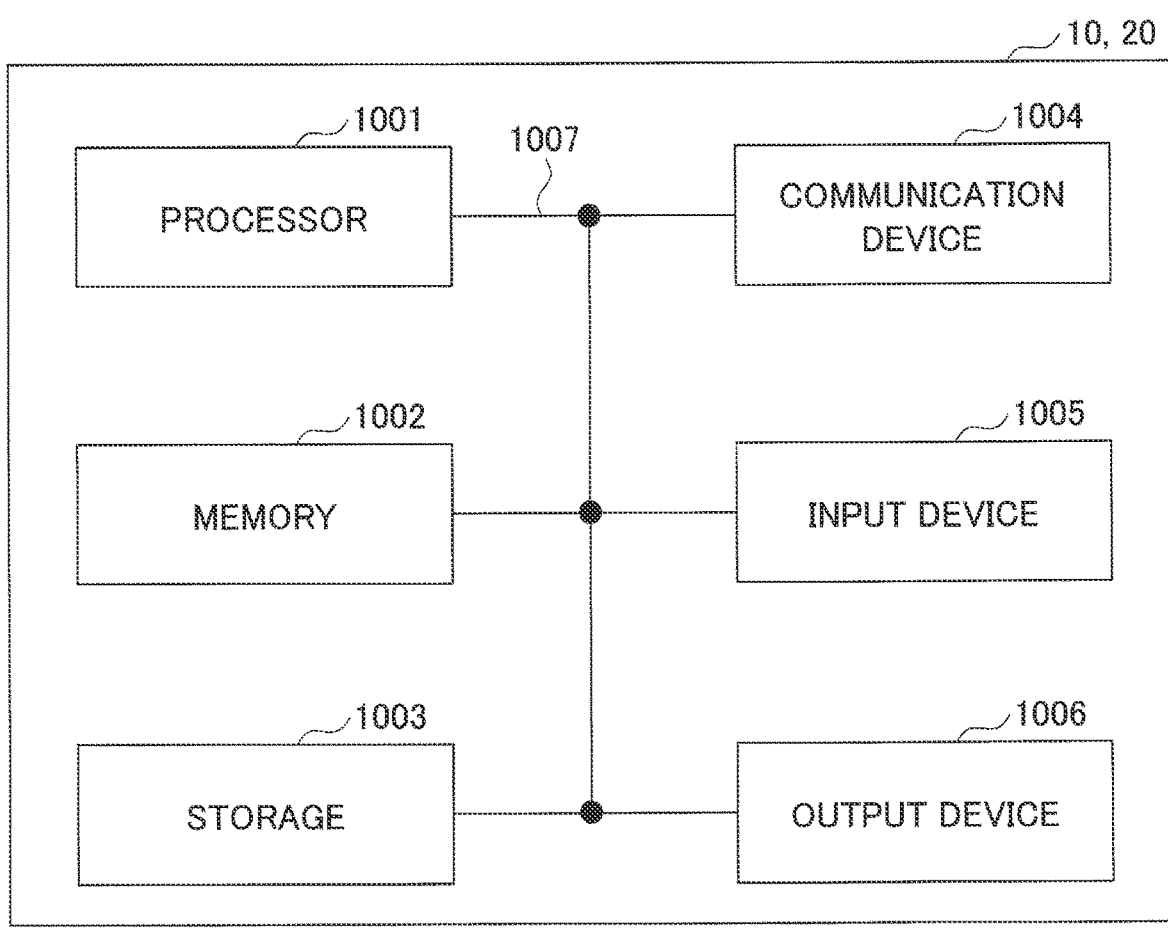
FIG. 15 is a diagram illustrating an example of a hardware configuration of the terminal 10 and the base station 20.

For example, the terminal 10 and the base station 20 according to an embodiment of the present invention may function as a computer that performs processing according to the present embodiment. FIG. 15 is a diagram illustrating an example of a hardware configuration of the terminal 10 and the base station 20 according to the present embodiment. The terminal 10 and the base station 20 may each be configured as a computer device including, physically, a processor 1001, memory 1002, a storage 1003, a communication device 1004, an input device 1005, an output device 1006, a bus 1007, and so forth.

In the following description, the term "device" can be replaced with circuit, a device, a unit, and so forth. The hardware configuration of the terminal 10 and base station 20 may be configured to include one or more of the devices denoted by 1001-1006 in the figure, or may be configured without some devices.

Each function of the terminal 10 and the base station 20 is implemented by loading predetermined software (program) on hardware, such as the processor 1001 and the memory 1002, so that the processor 1001 performs computation and controls communication by the communication device 1004, and at least one of reading and writing of data in the memory 1002 and the storage 1003.

The processor 1001, for example, operates an operating system to control the entire computer. The processor 1001 may be configured with a central processing unit (CPU: Central Processing Unit) including an interface with a peripheral device, a control device, a processing device, a register, and so forth.

Additionally, the processor 1001 reads a program (program code), a software module, data, and so forth from at least one of the storage 1003 and the communication device 1004 to the memory 1002, and executes various processes according to these. As the program, a program is used which causes a computer to execute at least a part of the operations described in the above-described embodiment. For example, the control unit 130 of the terminal 10 may be implemented by a control program that is stored in the memory 1002 and that is operated by the processor 1001, and other functional blocks may be similarly implemented. While the various processes described above are described as being executed in one processor 1001, they may be executed simultaneously or sequentially by two or more processors 1001. The processor 1001 may be implemented by one or more chips. The program may be transmitted from a network via a telecommunications line.

The memory 1002 is a computer readable storage medium, and, for example, the memory 1002 may be formed of at least one of a Read Only Memory ROM), an Erasable Programmable ROM (EPROM), an Electrically Erasable Programmable ROM (EEPROM), a Random Access Memory (RAM), and so forth. The memory 1002 may be referred to as a register, a cache, a main memory (main storage device), and so forth. The memory 1002 may store a program (program code), a software module, and so forth, which can be executed for implementing the radio communication method according to one embodiment of the present disclosure.

The storage 1003 is a computer readable storage medium and may be formed of, for example, at least one of an optical disk, such as a Compact Disc ROM (CD-ROM), a hard disk drive, a flexible disk, an optical magnetic disk (e.g., a compact disk, a digital versatile disk, a Blu-ray (registered trademark) disk, a smart card, a flash memory (e.g., a card, a stick, a key drive), a floppy (registered trademark) disk, and a magnetic strip. The storage 1003 may be referred to as an auxiliary storage device. The above-described storage medium may be, for example, a database including at least one of the memory 1002 and the storage 1003, a server, or any other suitable medium.

The communication device 1004 is hardware (transmitting and receiving device) for performing communication between computers through at least one of a wired network and a wireless network, and is also referred to, for example, as a network device, a network controller, a network card, a communication module, or the like. The communication device 1004 may be configured to include, for example, a high frequency switch, a duplexer, a filter, a frequency synthesizer, and so forth, to implement at least one of frequency division duplex (FDD: Frequency Division Duplex) and time division duplex (TDD: Time Division Duplex).

The input device 1005 is an input device (e.g., a keyboard, a mouse, a microphone, a switch, a button, a sensor) that receives an external input. The output device 1006 is an output device (e.g., a display, speaker, LED lamp) that performs output toward outside. The input device 1005 and the output device 1006 may be configured to be integrated (e.g., a touch panel).

Each device, such as processor 1001 and memory 1002, is also connected by the bus 1007 for communicating information. The bus 1007 may be formed of a single bus or may be formed of different buses between devices.

The terminal 10 and base station 20 may each include hardware, such as a microprocessor, a digital signal processor (DSP: Digital Signal Processor), an Application Specific Integrated Circuit (ASIC), a Programmable Logic Device (PLD), and a Field Programmable Gate Array (FPGA), which may implement some or all of each functional block. For example, processor 1001 may be implemented using at least one of these hardware components.

Conclusion of the Embodiments

In this specification, at least, communication devices and a communication method described below are disclosed.

A terminal including a receiving unit that receives information indicating whether each condition of one or more conditions for validating a time alignment is activated or deactivated; and a control unit that independently activates or deactivates each condition of the one or more conditions in accordance with the received information.

According to the above-described configuration, signaling overhead can be reduced and efficiency of the signaling can be enhanced compared to a method of transmitting information indicating all of the one or more conditions as a condition to validate the time alignment.

A terminal including a receiving unit that receives information indicating one combination from one or more possible combinations of one or more conditions for validating a time alignment; and a control unit that configures the one combination of the one or more conditions based on the received information.

According to the above-described configuration, signaling overhead can be reduced and efficiency of the signaling can be enhanced compared to a method of transmitting information indicating all of the conditions to validate the time alignment.

When the one combination includes a plurality of conditions, the receiving unit may receive information indicating priority of each condition of the plurality of conditions included in the one combination, and the control unit may configure the priority of each condition of the plurality of conditions included in the one combination in accordance with the received information indicating dependency.

When the plurality of conditions included in the one combination includes a first condition and a second condition, and when the priority assigned to the first condition is higher than the priority assigned to the second condition, the control unit may determine that a condition to validate the time alignment is satisfied upon detecting that the first condition is satisfied, regardless of whether the second condition is satisfied.

When the plurality of conditions included in the one combination includes a first condition and a second condition, and when the priority assigned to the first condition is higher than the priority assigned to the second condition, the control unit may determine that a condition to validate the time alignment is not satisfied upon detecting that the first condition is not satisfied, even if the second condition is satisfied.

A communication method executed by a terminal, the method including receiving information indicating one combination from among one or more possible combinations of one or more conditions for validating a time alignment; and a step of configuring the one combination of the one or more conditions based on the received information. According to the above-described configuration, signaling overhead can be reduced and efficiency of the signaling can be enhanced compared to a method of transmitting information indicating all of the conditions to validate the time alignment.

A base station including a control unit that configures information indicating whether a condition is to be activated or deactivated, wherein the condition is to be considered by a terminal in an idle mode to determine whether to validate a time alignment; and a transmitting unit that transmits the information configured by the control unit to the terminal in the idle mode. According to the above-described configuration, signaling overhead can be reduced and efficiency of the signaling can be enhanced compared to a method of transmitting information indicating all of the conditions to validate the time alignment.

Supplemental Embodiments

While the embodiments of the present invention are described above, the disclosed invention is not limited to the embodiments, and those skilled in the art will appreciate various alterations, modifications, alternatives, substitutions, or the like. Descriptions are provided using specific numerical examples to facilitate understanding of the invention, but, unless as otherwise specified, these values are merely examples and any suitable value may be used. Classification of the items in the above descriptions is not essential to the present invention, and the items described in two or more items may be used in combination as needed, or the items described in one item may be applied (unless inconsistent) to the items described in another item. The boundaries of functional units or processing units in the functional block diagram do not necessarily correspond to the boundaries of physical components. An operation by a plurality of functional units may be physically performed by one component or an operation by one functional unit may be physically executed by a plurality of components. For the processing procedures described in the embodiment, the order of processing may be changed as long as there is no inconsistency. For the convenience of the description of the process, the terminal 10 and the base station 20 are described using functional block diagrams, but such devices may be implemented in hardware, software, or a combination thereof. Software operated by a processor included in the terminal 10 in accordance with embodiments of the present invention and software operated by a processor included in the base station 20 in accordance with embodiments of the present invention may be stored in a random access memory (RAM), a flash memory (RAM), a read-only memory (ROM), an EPROM, an EEPROM, a register, a hard disk (HDD), a removable disk, a CD-ROM, a database, a server, or any other suitable storage medium.

Notification of information is not limited to the aspects/embodiments described in the disclosure, and notification of information may be made by another method. For example, notification of information may be implemented by physical layer signaling (e.g., Downlink Control Information (DCI), Uplink Control Information (UCI), higher layer signaling (e.g., Radio Resource Control (RRC) signaling, Medium Access Control (MAC) signaling, broadcast information (Master Information Block (MIB), System Information Block (SIB))), or other signals or combinations thereof. RRC signaling may be referred to as an RRC message, for example, which may be an RRC connection setup message, an RRC connection reconfiguration message, or the like.

The aspects/embodiments described in this disclosure may be applied to a system using at least one of Long Term Evolution (LTE), LTE-Advanced (LTE-A), SUPER 3G, IMT-Advanced, 4th generation mobile communication system (4G), 5th generation mobile communication system (5G), Future Radio Access (FRA), W-CDMA (Registered Trademark), GSM (Registered Trademark), CDMA2000, Ultra Mobile Broadband (UMB), IEEE 802.11 (Wi-Fi (Registered Trademark)), IEEE 802.16 (WiMAX (Registered Trademark)), IEEE 802.20, Ultra-WideBand (UWB), Bluetooth (Registered Trademark), any other appropriate system, and a next generation system extended based on theses. Additionally, a plurality of systems may be combined (e.g., a combination of at least one of LTE and LTE-A and 5G) to be applied.

The processing procedures, sequences, flow charts, etc. of each aspect/embodiment described in this disclosure may be reordered, provided that there is no contradiction. For example, the methods described in this disclosure present elements of various steps in an exemplary order and are not limited to the particular order presented.

The particular operation described in this disclosure to be performed by base station 20 may be performed by an upper node in some cases. It is apparent that in a network consisting of one or more network nodes having base stations 20, various operations performed for communicating with terminal may be performed by at least one of the base stations 20 and network nodes other than the base stations 20 (e.g., MME or S-GW can be considered, however, the network node is not limited to these). The case is exemplified above in which there is one network node other than the base station 20. However, the network node other than the base station 20 may be a combination of multiple other network nodes (e.g., MME and S-GW).

Input and output information may be stored in a specific location (e.g., memory) or managed using management tables. Input and output information may be overwritten, updated, or added. Output information may be deleted. The input information may be transmitted to another device.

The determination may be made by a value (0 or 1) represented by 1 bit, by a true or false value (Boolean: true or false), or by comparison of numerical values (e.g., a comparison with a predefined value).

The aspects/embodiments described in this disclosure may be used alone, in combination, or switched along with execution. Notice of a given information (e.g. "X" notice) may also be given by implication (e.g. "no notice of the given information").

Software should be broadly interpreted to mean, regardless of whether referred to as software, firmware, middleware, microcode, hardware description language, or any other name, instructions, sets of instructions, code, code segments, program code, programs, subprograms, software modules, applications, software applications, software packages, routines, subroutines, objects, executable files, executable threads, procedures, functions, and so forth.

Software, instructions, information, and the like may also be transmitted and received via a transmission medium. For example, when software is transmitted from a website, server, or other remote source using at least one of wireline technology (such as coaxial cable, fiber optic cable, twisted pair, digital subscriber line) and wireless technology (infrared, microwave), at least one of these wireline technology and wireless technology is included within the definition of a transmission medium.

The information, signals, and the like described in this disclosure may be represented using any of a variety of different techniques. For example, data, instructions, commands, information, signals, bits, symbols, chips, and the like which may be referred to throughout the above description may be represented by voltages, currents, electromagnetic waves, magnetic fields or magnetic particles, optical fields or photons, or any combination thereof.

The terms described in this disclosure and those necessary for understanding this disclosure may be replaced by terms having the same or similar meanings. For example, at least one of the channels and the symbols may be a signal (signaling). The signal may also be a message. The component carrier may also be referred to as a carrier frequency, cell, frequency carrier, and so forth.

As used in this disclosure, the terms "system" and "network" are used interchangeably. The information, parameters, and the like described in the present disclosure may also be expressed using absolute values, relative values from predetermined values, or they may be expressed using corresponding separate information. For example, radio resources may be those indicated by an index.

The name used for the parameters described above are not restrictive in any respect. In addition, the mathematical equations using these parameters may differ from those explicitly disclosed in this disclosure. Since the various channels (e.g., PUCCH, PDCCH) and information elements can be identified by any suitable name, the various names assigned to these various channels and information elements are not in any way limiting.

In this disclosure, the terms "Base Station," "Radio Base Station," "Fixed Station," "NodeB," "eNodeB (eNB)," "gNodeB (gNB)," "Access Point," "Transmission Point," "Reception Point," "Transmission/Reception Point," "Cell," "Sector," "Cell Group," "Carrier," "Component Carrier," and so forth may be used interchangeably. The base stations may be referred to in terms such as macro-cell, small-cell, femto-cell, pico-cell, or the like.

The base station can accommodate one or more (e.g., three) cells. Where the base station accommodates a plurality of cells, the entire coverage area of the base station can be divided into a plurality of smaller areas, each smaller area can also provide communication services by means of a base station subsystem (e.g., an indoor small base station (RRH) or a remote Radio Head). The term "cell" or "sector" refers to a portion or all of the coverage area of at least one of the base station and base station subsystem that provides communication services at the coverage.

In this disclosure, terms such as "mobile station (MS: Mobile Station)", "user terminal", "user equipment (UE: User Equipment", "terminal", and the like may be used interchangeably.

The mobile station may be referred to by one of ordinary skill in the art as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable term.

At least one of a base station and a mobile station may be referred to as a transmitter, receiver, communication device, or the like. At least one of a base station and a mobile station may be a device installed in a mobile body, a mobile body itself, and so forth. The mobile body may be a vehicle (e.g., a car, an airplane), an unmanned mobile (e.g., a drone, an automated vehicle), or a robot (manned or unmanned). At least one of a base station and a mobile station includes a device that does not necessarily move during communication operations. For example, at least one of a base station and a mobile station may be an Internet of Things (IoT) device such as a sensor.

In addition, the base station in the present disclosure may be read by the user terminal. For example, various aspects/embodiments of the present disclosure may be applied to a configuration in which communication between base stations and user terminals is replaced with communication between multiple user terminals (e.g., may be referred to as D2D (Device-to-Device), V2X (Vehicle-to-Everything)). In this case, a configuration may be such that the above-described function of the base station 20 is included in the user terminal 10. The terms "up" and "down" may also be replaced with the terms corresponding to terminal-to-terminal communication (e.g., "side"). For example, an uplink channel, a downlink channel, and the like, may be replaced with a sidelink channel. Similarly, the user terminal in the present disclosure may be replaced with the base station. In this case, a configuration may be such that the above-described function of the user terminal 10 is included in the base station 20.

The term "connected" or "coupled" or any variation thereof means any direct or indirect connection or connection between two or more elements and may include the presence of one or more intermediate elements between two elements "connected" or "coupled" with each other. The coupling or connection between the elements may be physical, logical, or a combination of these. For example, "connection" may be replaced with "access". As used in the present disclosure, the two elements may be considered as being "connected" or "coupled" to each other using at least one of the one or more wires, cables, and printed electrical connections and, as a number of non-limiting and non-inclusive examples, electromagnetic energy having wavelengths in the radio frequency region, the microwave region, and the light (both visible and invisible) region.

The reference signal may be abbreviated as RS (Reference Signal) or may be referred to as a pilot, depending on the standards applied.

As used in this disclosure, the expression "based on" does not mean "based on only" unless otherwise specified. In other words, the expression "based on" means both "based on only" and "at least based on."

When the terms "include", "including" and variations thereof are used in the present disclosure, these terms are intended to be comprehensive, similar to the term "comprising". Moreover, the term "or" as used in this disclosure is not intended to be an exclusive-OR.

In the present disclosure, where an article is added by translation, for example, "a," "an," and "the" of English, the disclosure may include that the noun following these articles is plural.

In this disclosure, the term "A and B are different" may mean "A and B are different from each other." Note that the term may mean "A and B are different from C." Terms such as "separated" or "combined" may be interpreted similar to "different."

While the present invention is described in detail above, those skilled in the art will appreciate that the invention is not limited to the embodiments described herein. The present invention may be implemented as modifications and variations without departing from the gist and scope of the present invention as defined by the scope of the claims. Accordingly, the description herein is merely illustrative and is not intended to restrict the scope of the present invention.

The present international patent application is based on and claims the benefit of priority to Japanese Patent Application No. 2019-034674, filed on Feb. 27, 2019, the entire content of Japanese Patent Application No. 2019-034674 is incorporated herein by reference.

LIST OF REFERENCE SYMBOLS 10 terminal
110 transmitting unit
120 receiving unit
130 control unit
20 base station
210 transmitting unit
220 receiving unit
230 control unit
1001 processor
1002 memory
1003 storage
1004 communication device
1005 input device
1006 output device

The invention claimed is:
1. A terminal comprising:
a receiver that receives a notification including information on a plurality of conditions to validate a time alignment in a radio communication using a preconfigured uplink resource, PUR;
a controller that validates the time alignment based on the received information on the plurality of conditions; and
a transmitter that performs uplink transmission using the PUR,
wherein the transmitter performs the uplink transmission at a predetermined cycle using the PUR to indicate presence of the terminal, and
wherein the terminal releases the PUR by using implicit signaling, wherein the implicit signaling is to consecutively skip uplink transmission using the PUR a predetermined number of times, the predetermined number being greater than one.
2. The terminal according to claim 1,
wherein the receiver receives a Time Alignment, TA, timer and Reference Signal Received Power, RSRP, as the information on the plurality of conditions, and
wherein the controller determines that the time alignment is valid if the TA timer is running and the RSRP does not increase or decrease by more than a predetermined threshold.
3. A communication system comprising:
a base station; and
a terminal,
wherein the base station transmits a notification including information on a plurality of conditions to validate a time alignment in a radio communication using a preconfigured uplink resource, PUR, and wherein the terminal includes
- a receiver that receives the notification from the base station,
- a controller that validates the time alignment based on the received information on the plurality of conditions, and
- a transmitter that performs uplink transmission using the PUR,
- wherein the transmitter performs the uplink transmission at a predetermined cycle using the PUR to indicate presence of the terminal, and wherein the terminal releases the PUR by using implicit signaling, wherein the implicit signaling is to consecutively skip uplink transmission using the PUR a predetermined number of times, the predetermined number being greater than one.

4. A communication method executed by a terminal, the method comprising:
- receiving a notification including information on a plurality of conditions to validate a time alignment in a radio communication using a preconfigured uplink resource, PUR;
- validating the time alignment based on the received information on the plurality of conditions; and
- performing uplink transmission using the PUR,
- wherein the performing performs the uplink transmission at a predetermined cycle using the PUR to indicate presence of the terminal, and
- wherein the terminal releases the PUR by using implicit signaling, wherein the implicit signaling is to consecutively skip uplink transmission using the PUR a predetermined number of times, the predetermined number being greater than one.

* * * * *